United States Patent
Mark et al.

(10) Patent No.: US 10,437,416 B2
(45) Date of Patent: Oct. 8, 2019

(54) PERSONALIZED LAUNCH STATES FOR SOFTWARE APPLICATIONS

(71) Applicant: Samsung Electronics Co., Ltd., Suwon-si, Gyeonggi-do (KR)

(72) Inventors: Gilead Mark, Palo Alto, CA (US); Thomas Francis, Dubuque, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 14/980,965

(22) Filed: Dec. 28, 2015

(65) Prior Publication Data
US 2017/0090719 A1 Mar. 30, 2017

Related U.S. Application Data

(60) Provisional application No. 62/233,663, filed on Sep. 28, 2015.

(51) Int. Cl.
*G06F 3/0481* (2013.01)
*G06F 9/451* (2018.01)
(Continued)

(52) U.S. Cl.
CPC ........ *G06F 3/04817* (2013.01); *G06F 3/0414* (2013.01); *G06F 3/0482* (2013.01);
(Continued)

(58) Field of Classification Search
CPC .. G06F 3/0482; G06F 3/04842; G06F 3/0481; G06F 3/0484; G06F 9/4443; G06F 3/04817; G06F 3/04883; H04L 67/306
See application file for complete search history.

(56) References Cited

U.S. PATENT DOCUMENTS 5,732,275 A 3/1998 Kullick et al.
7,739,602 B2 6/2010 Feng et al.
(Continued)

FOREIGN PATENT DOCUMENTS

KR 20150009867 A 1/2015

OTHER PUBLICATIONS

PCT International Search Repot and Written Opinion for PCT Application No. PCT/IB2016/055771, dated Dec. 9, 2016, 11 pages.
U.S. Appl. No. 15/245,403, filed Aug. 24, 2016, Gilead Mark.

*Primary Examiner* — Tuyetlien T Tran
(74) *Attorney, Agent, or Firm* — Jefferson IP Law, LLP

(57) ABSTRACT

Systems and methods are provided and include receiving, at a user device, a first user input from a user, the first user input selecting an application icon displayed at the user device. In response to receiving the first user input, the user device launches the native application and sets the native application into the home state. The user device receives a second user input configured to set the native application into a state of the native application other than the home state. In response to receiving the second user input, the user device sets the native application into the other state using the user device. The user device determines that the user frequently sets the native application into the other state, and configures the application icon to, upon being selected, cause the user device to launch the native application and set the native application into the other state.

12 Claims, 14 Drawing Sheets

(51) Int. Cl.
*G06F 16/9535* (2019.01)
*G06F 3/041* (2006.01)
*G06F 3/0482* (2013.01)
*G06F 3/0488* (2013.01)
*G06F 3/0484* (2013.01)
*H04L 29/08* (2006.01)

(52) U.S. Cl.
CPC ........ *G06F 3/0488* (2013.01); *G06F 3/04842* (2013.01); *G06F 3/04883* (2013.01); *G06F 9/451* (2018.02); *G06F 16/9535* (2019.01); *H04L 67/306* (2013.01)

(56) References Cited

U.S. PATENT DOCUMENTS

| | | |
|---|---|---|
| 8,627,223 B1 | 1/2014 | Katzer et al. |
| 8,826,116 B2 | 9/2014 | Martin et al. |
| 9,410,815 B1 | 8/2016 | Hirano et al. |
| 2005/0141566 A1* | 6/2005 | Krzyzanowski .... H04L 12/2805 370/503 |
| 2005/0240917 A1 | 10/2005 | Wu |
| 2008/0158396 A1 | 7/2008 | Fainstain et al. |
| 2010/0162232 A1 | 6/2010 | Bhatia et al. |
| 2010/0318894 A1 | 12/2010 | Billharz et al. |
| 2012/0260202 A1 | 10/2012 | Jiang et al. |
| 2013/0024814 A1 | 1/2013 | Kim et al. |
| 2013/0191774 A1 | 7/2013 | Choi et al. |
| 2014/0006868 A1 | 1/2014 | Grey et al. |
| 2014/0165012 A1 | 6/2014 | Shen et al. |
| 2014/0280580 A1* | 9/2014 | Langlois ................. H04W 4/70 709/204 |
| 2014/0282606 A1* | 9/2014 | Clark ...................... G06F 9/461 718/108 |
| 2014/0317527 A1* | 10/2014 | Won .................... G06F 3/04897 715/746 |
| 2015/0052222 A1 | 2/2015 | Farrell et al. |
| 2015/0358810 A1 | 12/2015 | Chao et al. |
| 2016/0048294 A1 | 2/2016 | Micheva et al. |
| 2016/0054897 A1 | 2/2016 | Holmes et al. |

* cited by examiner

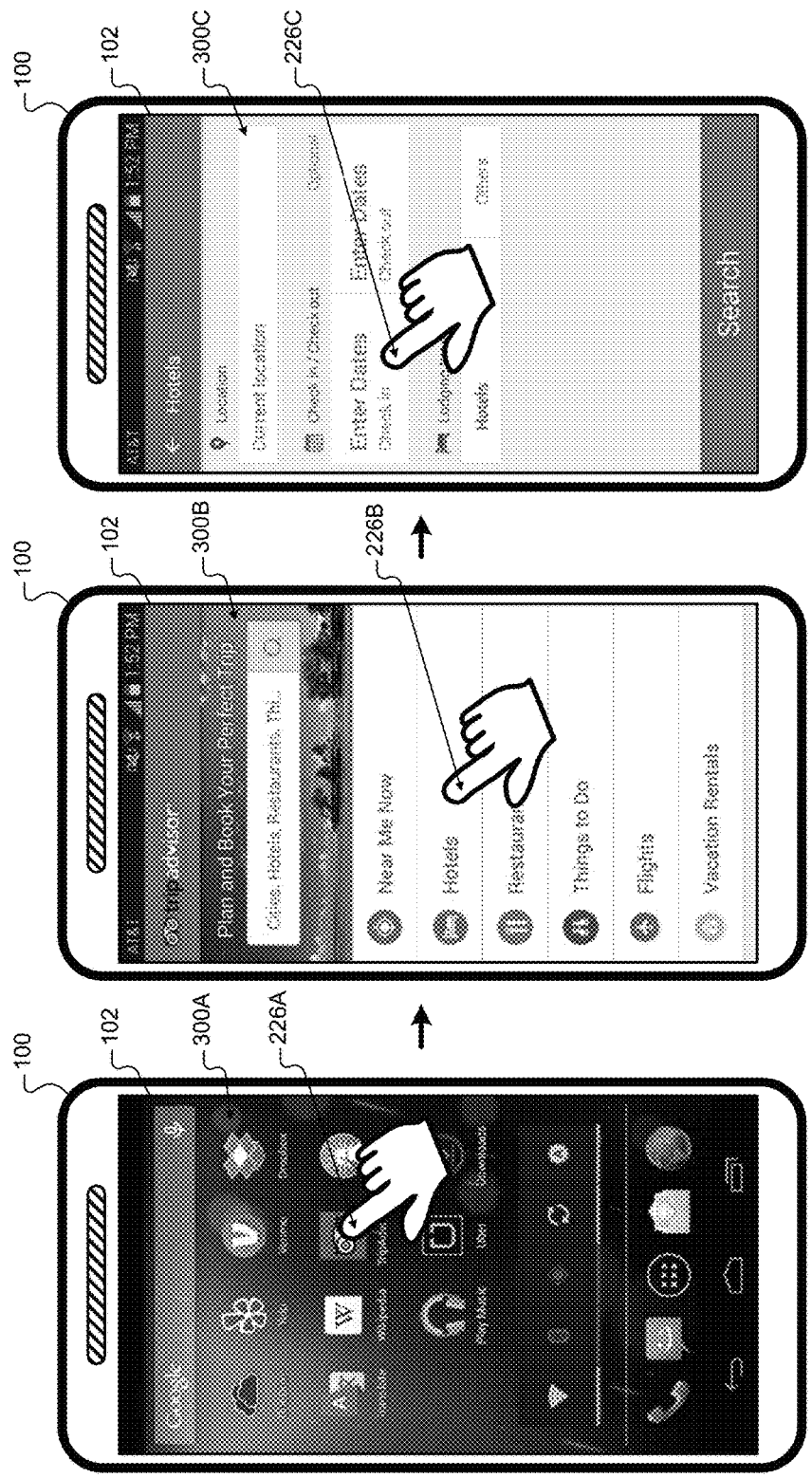

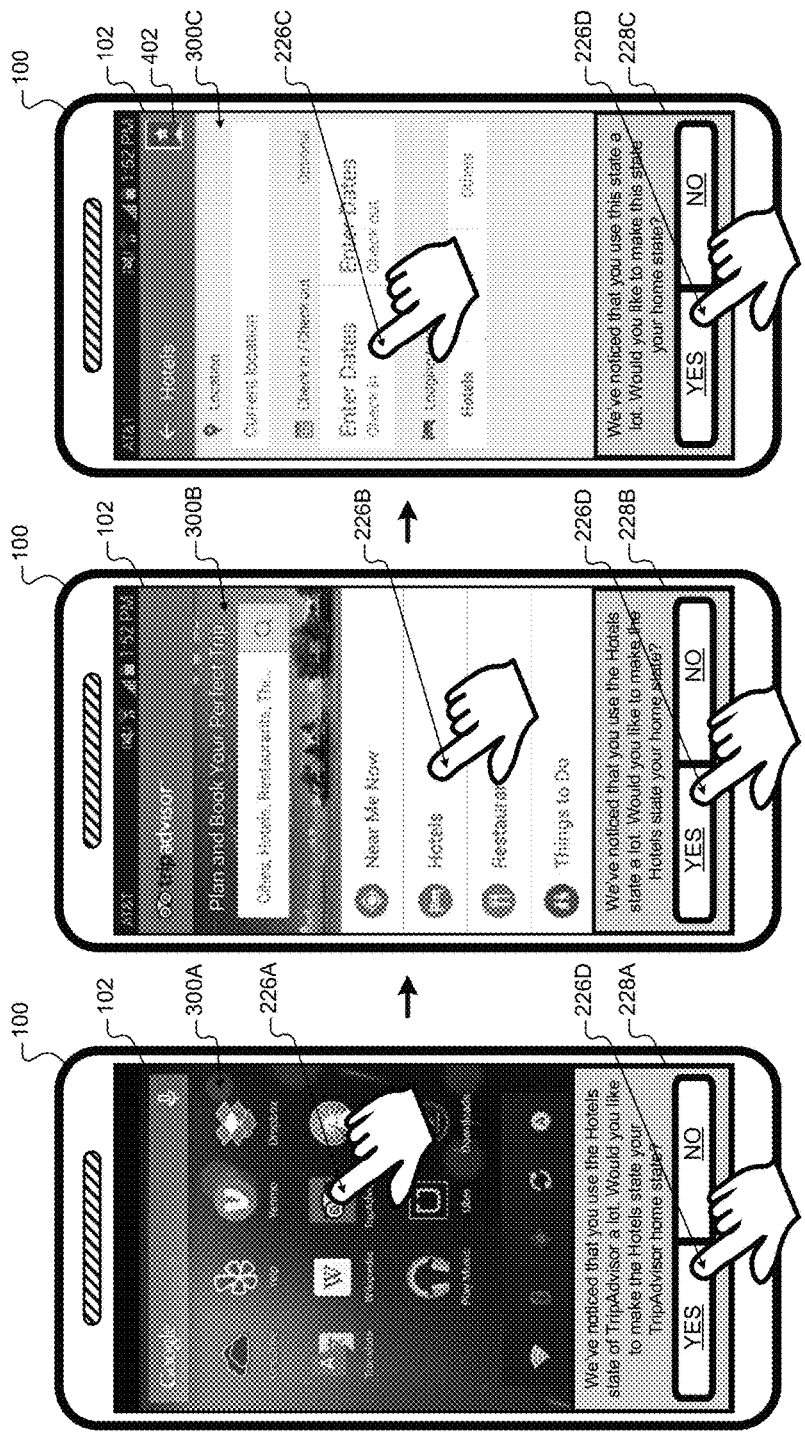

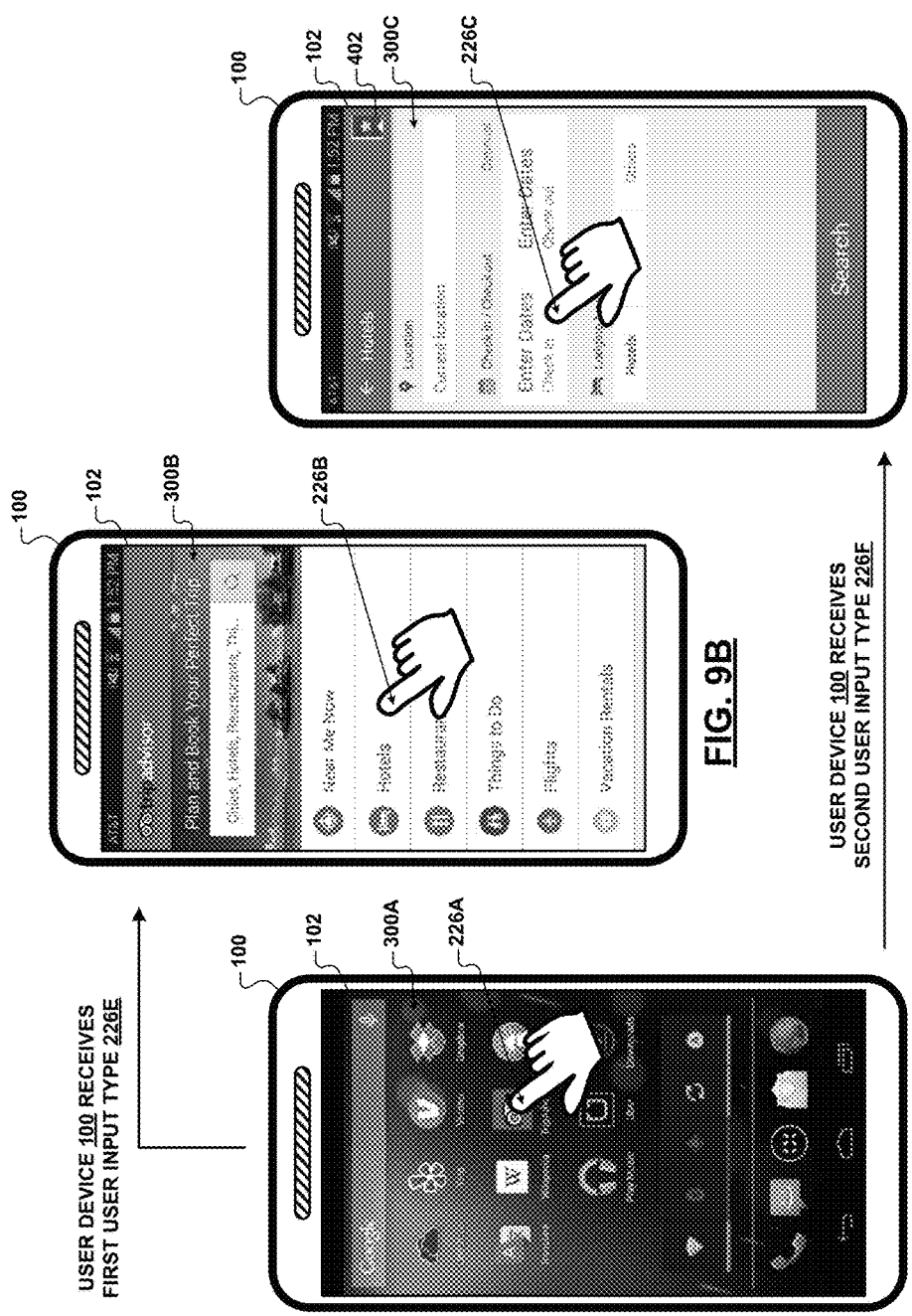

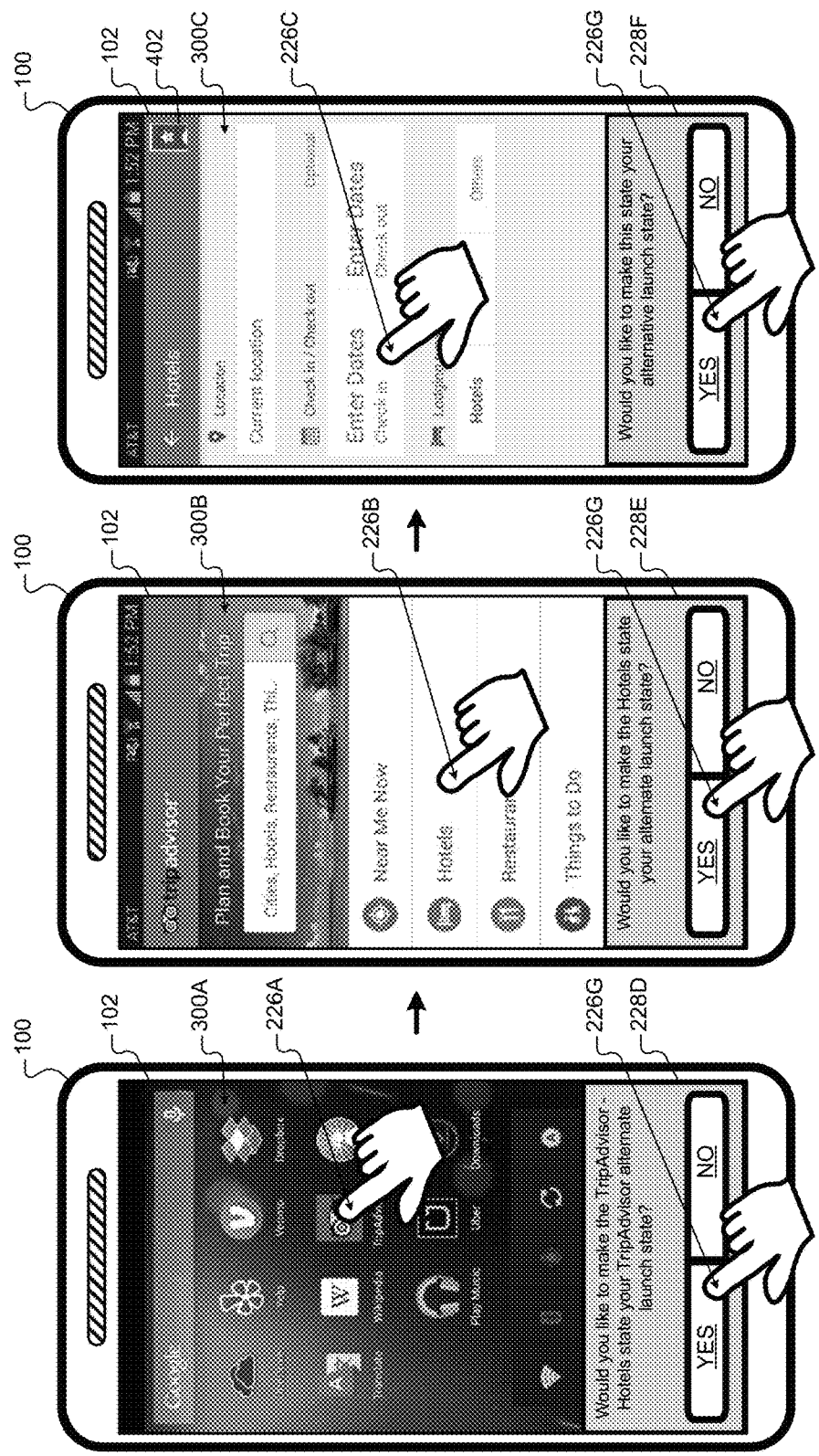

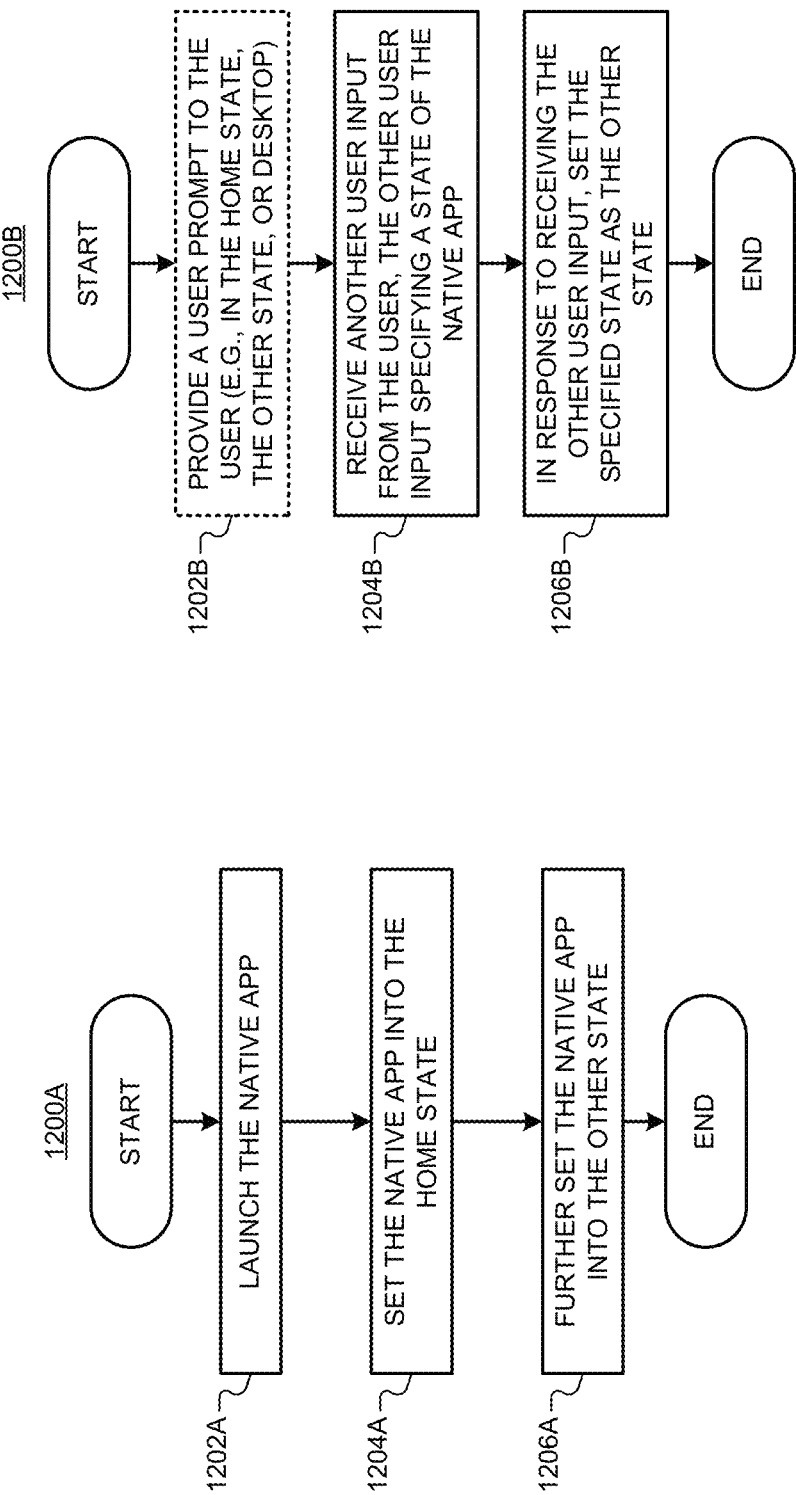

PERSONALIZED LAUNCH STATES FOR SOFTWARE APPLICATIONS

CROSS-REFERENCE TO RELATED APPLICATIONS

This application claims the benefit of U.S. Provisional Application No. 62/233,663, filed on Sep. 28, 2015. The entire disclosure of the application referenced above is incorporated herein by reference.

FIELD

This disclosure generally relates to the field of software applications, and more particularly to techniques for accessing software application states.

BACKGROUND

In recent years, the use of computers, smartphones, and other Internet-connected computing devices has grown significantly. Correspondingly, the number of software applications (apps) available for such computing devices has also grown. Today, many diverse software apps can be accessed on a number of different computing devices, including, but not limited to, smartphones, personal computers, automobiles, and televisions. These software apps can include business driven apps, games, educational apps, news apps, shopping apps, messaging apps, media streaming apps, and social networking apps, as some examples. Despite the large number of software apps available today and the wide range of functionality they provide, computing device users may use one or more specific software apps and/or features thereof to perform particular functions or tasks required by the users.

SUMMARY

In one example, a method includes receiving, at a user device, a first user input from a user. In this example, the first user input selects an application (app) icon displayed at the user device. The app icon is associated with a native app installed on the user device and configured to, upon being selected, cause the device to launch the app and set the app into a home state of the app. The method includes, in response to receiving the first user input, launching the native app and setting the app into the home state using the user device. The method further includes receiving, at the user device, a second, different, user input from the user. In this example, the second user input is configured to set the native app into a state of the app other than the home state. The method includes, in response to receiving the second user input, setting the native app into the other state using the user device. The method still further includes, in response to setting the native app into the other state, determining, using the user device that the user frequently sets the app into the other state. The method also includes, in response to determining that the user frequently sets the native app into the other state, configuring the app icon to, upon being selected, cause the user device to launch the native app and set the app into the other state.

In other features, one or more of the first and second user inputs can each comprise one or more of a finger contact input and a pressure input received at a touchscreen of the user device.

In other features, one or more of the first and second user inputs can each comprise a cursor selection input received via one or more of a computer mouse and a trackpad of the user device.

In other features, configuring the application icon to, upon being selected, can cause the user device to launch the native application and set the native application into the other state comprises configuring the application icon to, upon being selected, cause the user device to launch the native application, set the native application into the home state, and further set the native application into the other state.

In other features, the method can further include receiving, at the user device, a third user input from the user, wherein the first, second, and third user inputs are different. Further, configuring the application icon to, upon being selected, can cause the user device to launch the native application and set the native application into the other state comprises configuring the application icon based on the third user input.

In other features, the method can further include providing, using the user device, a user prompt to the user, wherein receiving the third user input from the user comprises receiving the third user input in response to providing the user prompt.

In other features, the method can further include providing the user prompt to the user and receiving the third user input in response to providing the user prompt comprises providing the user prompt and receiving the third user input upon launching the native application and setting the native application into the home state.

In other features, providing the user prompt to the user and receiving the third user input in response to providing the user prompt can comprise providing the user prompt and receiving the third user input upon launching the native application and setting the native application into the other state.

In other features, determining that the user frequently sets the native application into the other state can comprise determining that the user device has recently set the native application into the other state.

In other features, determining that the user frequently sets the native application into the other state can comprise determining that the user device has recently launched the native application.

In another example, a method includes receiving, at a user device, a user input from a user. In this example, the user input selects an app icon displayed at the user device and associated with a native app installed on the device. The method further includes, in response to receiving the user input, determining, using the user device, that the input corresponds to one of a first user input type and a second user input type. The method also includes, when the user input corresponds to the first user input type, launching the native app and setting the app into a home state of the app using the user device, and, when the input corresponds to the second user input type, launching the app and setting the app into a state of the app other than the home state using the device.

In other features, the user input can comprise one or more of a finger contact input and a pressure input received at a touchscreen of the user device.

In other features, the user input can comprise a cursor selection input received via one or more of a computer mouse and a trackpad of the user device.

In other features, he first user input type can comprise a momentary input having a relatively short time duration, and wherein the second user input type comprises a prolonged input having a relatively longer time duration than that of the momentary input.

In other features, the first user input type can comprise a shallow input having a relatively small depression depth with respect to a pressure-sensitive display screen of the user device, and wherein the second user input type comprises a deep input having a relatively large depression depth with respect to the pressure-sensitive display screen than that of the shallow input.

In other features, the first user input type can comprise a first user gesture with respect to a display screen of the user device, wherein the second user input type comprises a second user gesture with respect to the display screen, and wherein the first and second user gestures are different.

In other features, the application icon can be configured to, upon being selected, cause the user device to launch the native application and set the native application into the home state, and wherein launching the native application and setting the native application into the other state when the user input corresponds to the second user input type comprises launching the native application, setting the native application into the home state, and further setting the native application into the other state.

In other features, the application icon can be configured to, upon being selected, cause the user device to launch the native application and set the native application into the home state, and wherein launching the native application and setting the native application into the other state when the user input corresponds to the second user input type comprises configuring the application icon to, upon being selected, cause the user device to launch the native application and set the native application directly into the other state.

In other features, the user input can comprise a first user input. The method can further include receiving, at the user device, a second user input from the user, wherein the first and second user inputs are different, and wherein the second user input specifies a state of the native application and, in response to receiving the second user input, setting the state specified by the second user input as the other state using the user device.

In other features, the method can further comprise providing, using the user device, a user prompt to the user, wherein receiving the second user input from the user comprises receiving the second user input in response to providing the user prompt.

In other features, providing the user prompt to the user and receiving the second user input in response to providing the user prompt can comprise providing the user prompt and receiving the second user input upon launching the native application and setting the native application into the home state.

In other features, providing the user prompt to the user and receiving the second user input in response to providing the user prompt can comprise providing the user prompt and receiving the second user input upon launching the native application and setting the native application into the other state.

In another example, a system includes one or more computing devices configured to receive, at a user device, a first user input from a user. In this example, the first user input selects an app icon displayed at the user device. The app icon is associated with a native app installed on the user device and configured to, upon being selected, cause the device to launch the app and set the app into a home state of the app. The computing devices are configured to, in response to receiving the first user input, launch the native app and set the app into the home state using the user device. The computing devices are further configured to receive, at the user device, a second, different, user input from the user. In this example, the second user input is configured to set the native app into a state of the app other than the home state. The computing devices are configured to, in response to receiving the second user input, set the native app into the other state using the user device. The computing devices are still further configured to, in response to setting the native app into the other state, determine, using the user device, that the user frequently sets the app into the other state. The computing devices are also configured to, in response to determining that the user frequently sets the native app into the other state, configure the app icon to, upon being selected, cause the user device to launch the native app and set the app into the other state.

In another example, a system includes one or more computing devices configured to receive, at a user device, a user input from a user. In this example, the user input selects an app icon displayed at the user device and associated with a native app installed on the device. The computing devices are further configured to, in response to receiving the user input, determine, using the user device, that the input corresponds to one of a first user input type and a second user input type. The computing devices are also configured to, when the user input corresponds to the first user input type, launch the native app and set the app into a home state of the app using the user device, and, when the input corresponds to the second user input type, launch the app and set the app into a state of the app other than the home state using the device.

In another example, a non-transitory computer-readable storage medium includes instructions that cause one or more computing devices to receive, at a user device, a first user input from a user. In this example, the first user input selects an app icon displayed at the user device. The app icon is associated with a native app installed on the user device and configured to, upon being selected, cause the device to launch the app and set the app into a home state of the app. The instructions cause the computing devices to, in response to receiving the first user input, launch the native app and set the app into the home state using the user device. The instructions further cause the computing devices to receive, at the user device, a second, different, user input from the user. In this example, the second user input is configured to set the native app into a state of the app other than the home state. The instructions cause the computing devices to, in response to receiving the second user input, set the native app into the other state using the user device. The instructions still further cause the computing devices to, in response to setting the native app into the other state, determine, using the user device, that the user frequently sets the app into the other state. The instructions also cause the computing devices to, in response to determining that the user frequently sets the native app into the other state, configure the app icon to, upon being selected, cause the user device to launch the native app and set the app into the other state.

In another example, a non-transitory computer-readable storage medium includes instructions that cause one or more computing devices to receive, at a user device, a user input from a user. In this example, the user input selects an app icon displayed at the user device and associated with a native app installed on the device. The instructions further cause the computing devices to, in response to receiving the user input, determine, using the user device, that the input corresponds to one of a first user input type and a second user input type. The instructions also cause the computing devices to, when the user input corresponds to the first user input type, launch the native app and set the app into a home state of the app using the user device, and, when the input corresponds to the second user input type, launch the app and set the app into a state of the app other than the home state using the device.

BRIEF DESCRIPTION OF THE DRAWINGS

The details of one or more examples are set forth in the accompanying drawings and the description below. Other features, objects, and advantages will be apparent from the description and drawings, and from the claims.

FIGS. 3A-5B illustrate example graphical user interfaces (GUIs) that may be generated on a user device according to this disclosure.

FIGS. 9A-10C illustrate other example GUIs that may be generated on a user device according to this disclosure.

FIGS. 11-12B are flow diagrams that illustrate example methods for launching a native app and accessing one of a home state and a personalized launch state of the app in response to receiving a user input.

DETAILED DESCRIPTION

Figure 1B:
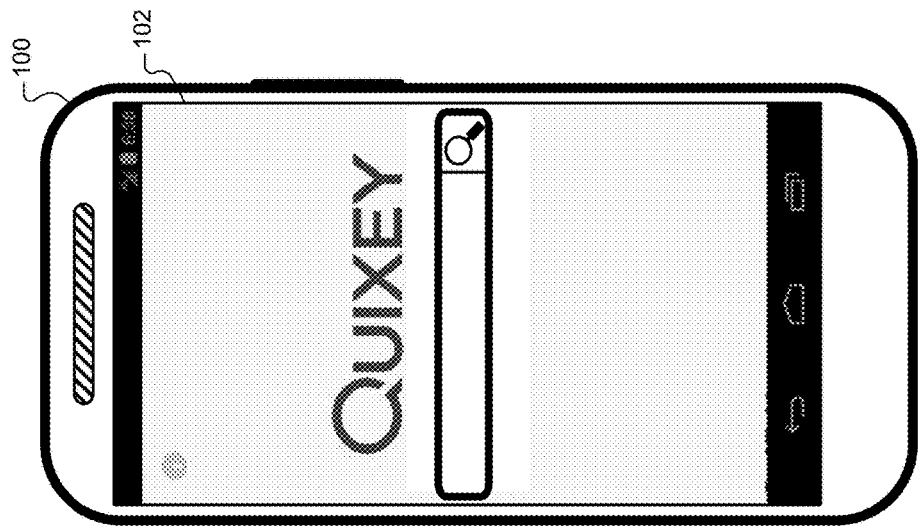
FIGS. 1A-1B illustrate example user devices that may be used to implement the techniques of the present disclosure.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of software applications (apps), and, more particularly, to techniques for accessing states of software apps installed on computing devices (e.g., laptops, tablets, smartphones, and smart watches). Specifically, the techniques of this disclosure are directed to enabling users of user devices to access specific (e.g., frequently used) states of software apps that are installed on the devices by interacting directly with app icons associated with the apps and displayed at display screens (e.g., including touchscreens) of the devices. Using the techniques described herein may, in some examples, improve the users' experience when accessing various states of the software apps using the user devices.

According to the techniques disclosed herein, as one example, a user device (e.g., a laptop, tablet, smartphone, or smart watch) may receive a first user input (e.g., one of a finger contact input, a pressure input, and a cursor selection input) from a user of the device. In this example, the first user input may select an app icon displayed at the user device (e.g., select an area of a display screen of the device used to display the icon). For example, the app icon may be associated with a native app that is installed on the user device and configured to, upon being selected, cause the device to launch the app and set the app into a home state of the app (e.g., a main GUI, or "screen," of the app, or a last-used state of the app, any of which may include static and/or dynamic content). A native app, as used herein, may refer to an app that is installed and executed on a user device. A web-based app, in turn, may refer to an app that is accessible from a user device via a web browser app included on the device. In any case, the user device may, in response to receiving the first user input, launch the native app and set the app into the home state. Also in this example, the user device may further receive a second, different user input (e.g., another one of a finger contact, pressure, and cursor selection input) from the user. For example, the second user input may be configured to set the native app into a state of the app other than the home state (e.g., a so-called "deeper" state than the home state). In response to receiving the second user input, the user device may set the native app into the other state. Also in this example, in response to setting the native app into the other state, the user device may determine that the user frequently sets the app into the other state (e.g., that the user frequently uses the functionality associated with the other state). For example, upon setting the native app into the other state, the user device may determine that the device has set the app into the other state a predetermined number of times (e.g., over a predefined time period). In this example, in response to making the above-described determination (and, e.g., receiving an additional user input), the user device may configure the app icon to, upon being selected, cause the device to launch the native app and set the app directly into the other state.

As another example, the user device may receive a user input (e.g., one of a finger contact, pressure, and cursor selection input) from the user. In this example, the user input may select an app icon displayed at the user device and associated with a native app installed on the device, in a similar manner as described above. In response to receiving the user input, the user device may determine that the input corresponds to one of a first user input type and a second user input type (e.g., one of a momentary input, a prolonged input, a shallow touchscreen depression input, a deep touchscreen depression input, and a particular gesture). In this example, when the user input corresponds to the first user input type, the user device may launch the native app and set the app into the home state. Alternatively, when the user input corresponds to the second user input type, the user device may launch the native app and set the app into a state of the app other than the home state (e.g., a deeper state specified by the user).

In this manner, the techniques described herein may improve the way users interact with computing devices to access states of native apps that are installed on the devices. Specifically, the techniques may enable a user of a user device to access a specific state of a native app that is installed on the device by interacting directly with an app icon associated with the app and displayed at a display screen of the device. As a result, the techniques may enable the user to avoid the inconvenience of first launching the native app on the user device and subsequently accessing the state within the launched app (e.g., setting the app into the state).

Figure 1A:
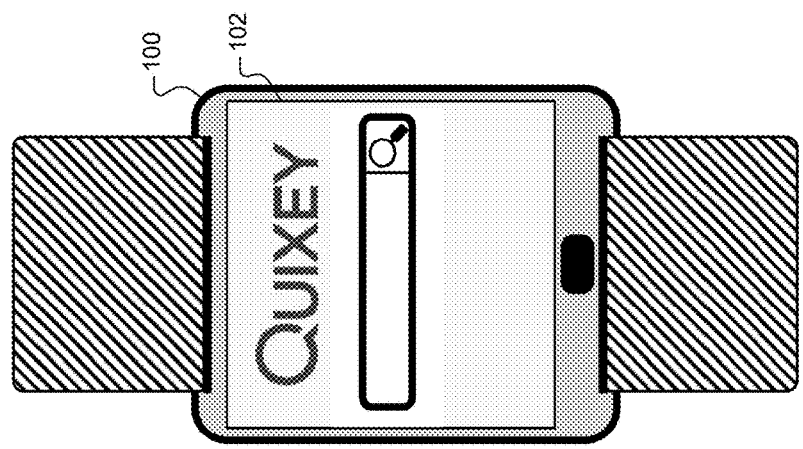

FIGS. 1A-1B illustrate example user devices 100 that may be used to implement the techniques of the present disclosure. As shown in FIG. 1A, the user device 100 may be a smart watch computing device configured to be worn around a user's wrist. Alternatively, as shown in FIG. 1B, the user device 100 may be a smartphone computing device configured to be held in a user's palm. In other examples, the user device 100 may be a tablet, a laptop computer, or a desktop computer. In still other examples, the user device 100 may be a computing device having another form factor, such as a computing device included in a vehicle, a gaming device, a television, or another appliance (e.g., a networked home automation device or appliance).

In general, the user device 100 of this disclosure may be any computing device capable of receiving user inputs that select app icons displayed at a display screen 102 of the device 100. In some examples, the user device 100 is configured to receive the user inputs via a touchscreen (e.g., a user input device layered over the display screen 102 and configured to receive finger contact and/or pressure inputs from users). As one example, the touchscreen (e.g., a capacitive touchscreen) may be configured to receive finger contact inputs (e.g., user finger taps and/or swipes) from users. For instance, the touchscreen may be configured to receive user inputs generated using any of fingers of the users' hands, other parts of the users' bodies (e.g., portions of the users' palms), and other objects that are not part of the users' bodies (e.g., conductive styli), so long as the body parts or objects used are substantially electrically conductive. Additionally, or alternatively, the touchscreen (e.g., a resistive touchscreen) may be configured to receive pressure inputs (e.g., user finger or stylus pushes and/or swipes) from the users. For example, the touchscreen may be configured to receive user inputs generated using any of fingers of the users' hands, other parts of the users' bodies, and other objects not part of the users' bodies (e.g., styli), irrespective of the body part or object being electrically conductive. In still other examples, the user device 100 may be configured to receive the user inputs via an integrated or peripheral mouse or trackpad (e.g., a user input device configured to receive cursor inputs from users). For example, the mouse or trackpad may be configured to receive one or more of cursor motion inputs (e.g., cursor movements, such as gestures, and/or scrolling) and cursor selection inputs (e.g., clicking, or double-clicking) from the users.

The user device 100 may use various different operating systems or platforms. In examples where the user device 100 is a mobile device (e.g., a smart watch or a smartphone), the device 100 may operate using an operating system (OS), such as ANDROID® by Google, Inc., IOS® by Apple, Inc., or WINDOWS PHONE® by Microsoft Corporation. In examples where the user device 100 is a laptop or desktop computer, the device 100 may use an OS, such as MICROSOFT WINDOWS® by Microsoft Corporation, MAC OS® by Apple, Inc., or LINUX® (LINUX® is the registered trademark of Linus Torvalds in the U.S. and other countries). The user device 100 may interact with users and/or other systems or devices using operating systems other than those described herein, whether presently available or developed in the future.

Figure 2A:
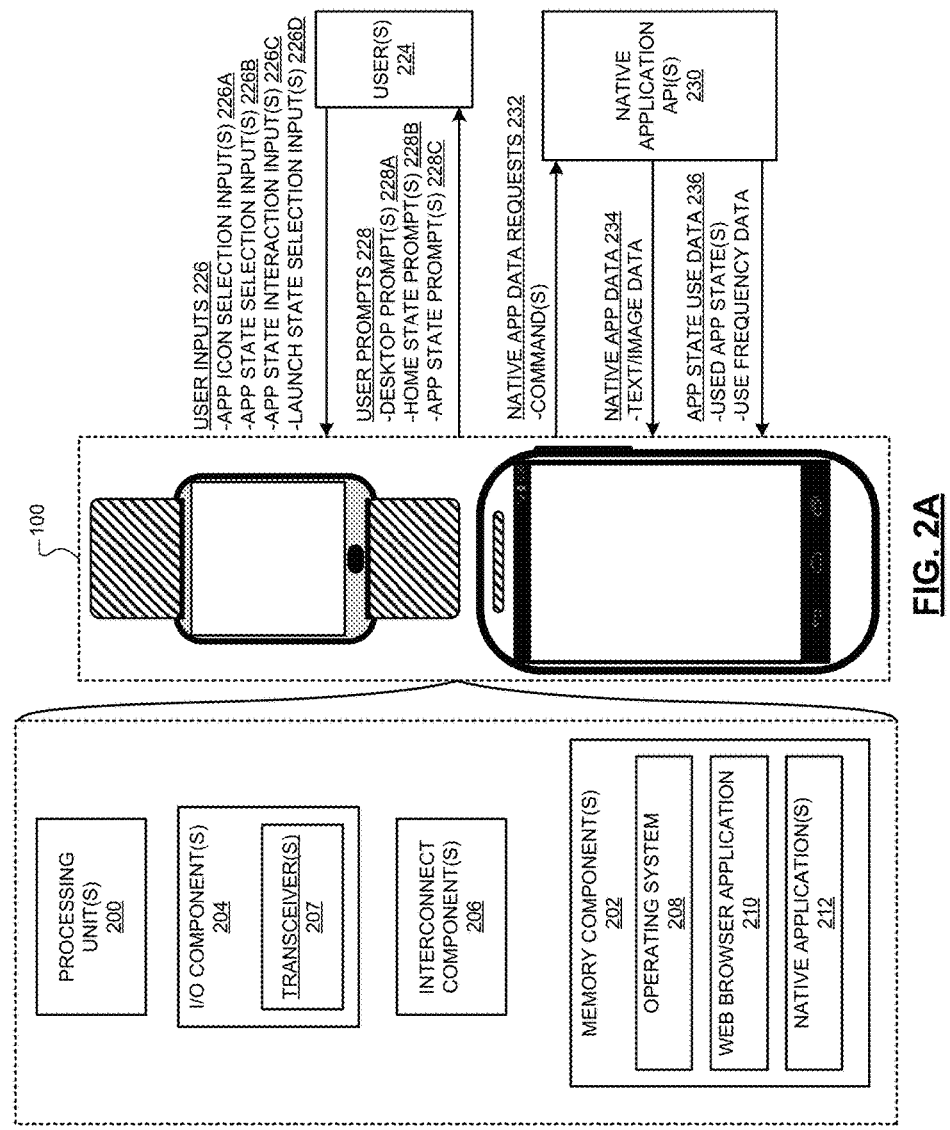
FIGS. 2A-2B are functional block diagrams of an example user device in communication with one or more of a user and an application programming interface (API).
Figure 2B:
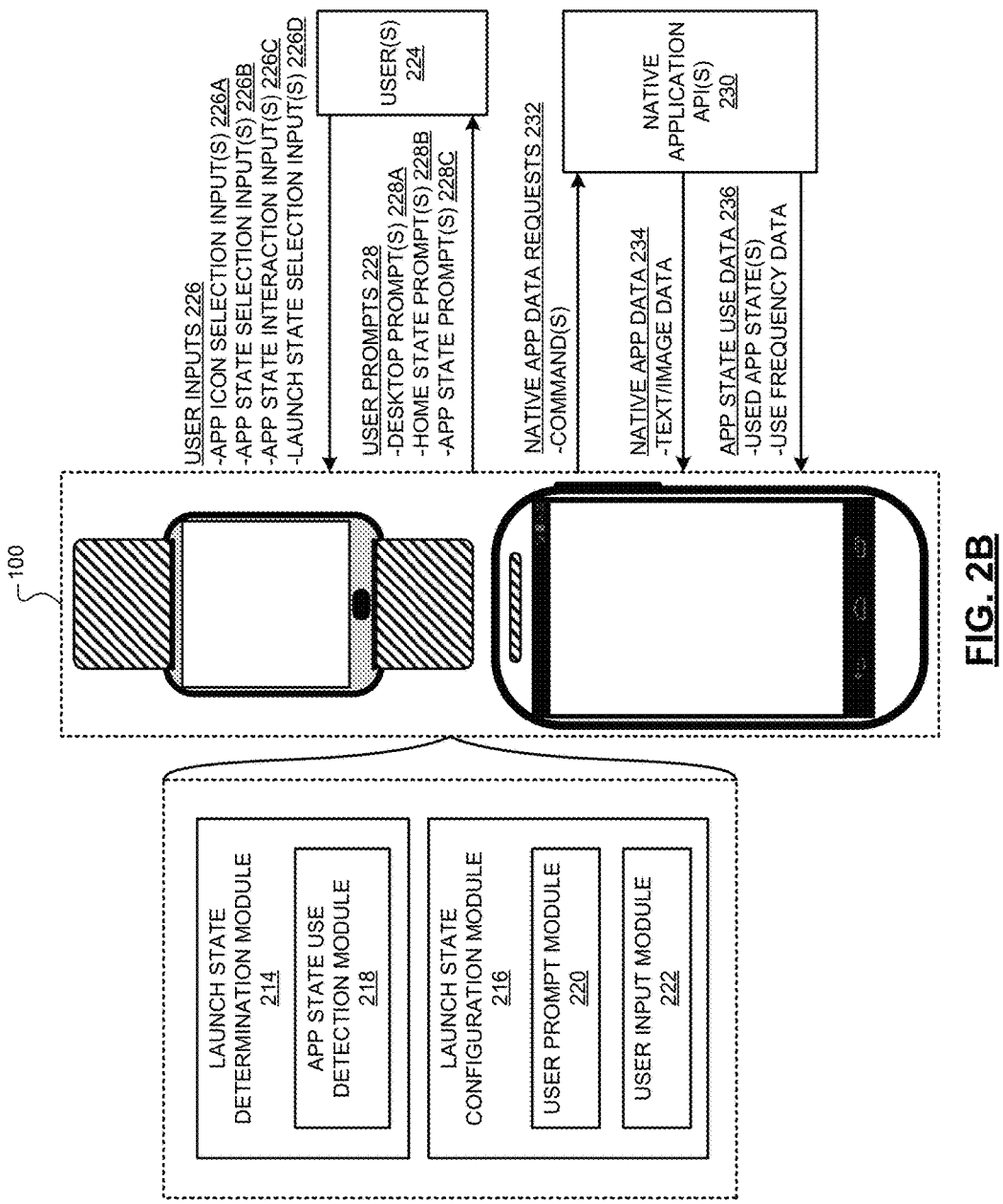

FIGS. 2A and 2B are functional block diagrams of an example user device 100 in communication with one or more users 224 and native app programming interfaces (APIs) 230. In this disclosure, an API may refer to one or more remote servers and/or data stores used by a native app during the course of its operation. For example, the native app may transmit requests for data to and receive data from the API to perform one or more functions associated with the app. As shown in FIG. 2A, the user device 100 includes one or more processing unit(s) 200, memory component(s) 202, input/output (I/O) component(s) 204, and interconnect components 206. The I/O components 204 may include one or more transceiver(s) 207. As further shown in FIG. 2A, the memory component(s) 202, for example, store code that is executed by the processing unit(s) 200 for an operating system (OS) 208, a web browser application 210, and one or more native application(s) 212 (e.g., that are installed on the user device 100).

For example, the processing unit(s) 200 may be configured to execute instructions stored in the memory component(s) 202 and communicate with the memory component(s) 202 and I/O component(s) 204, including the transceiver(s) 207, (e.g., via the interconnect component(s) 206). Each of the OS 208, web browser app 210, and native app(s) 212 may be embodied in computer-executable instructions that are executed by the processing unit(s) 200. The memory component(s) 202 may be configured to store executable instructions, system parameters, and other data in addition to the contents described above.

As shown in FIG. 2B, the user device 100 includes a launch state determination module 214, and a launch state configuration module 216. As further shown, the launch state determination module 214 includes an app state use detection module 218, which is described below. As also shown, the launch state configuration module 216 includes a user prompt module 220 and a user input module 222, which are also described below. The modules may be implemented by and embodied in electronic hardware, software, firmware, and/or any combination thereof. For example, one or more of the launch state determination module 214, the app state use detection module 218, the launch state configuration module 216, the user prompt module 220, and the user input module 222 may be implemented by and embodied in computer-executable instructions stored in the memory component(s) 202 that are executed by the processing unit(s) 200. Alternatively, one or more of the launch state determination module 214, the app state use detection module 218, the launch state configuration module 216, the user prompt module 220, and the user input module 222 may be, in whole or in part, implemented by and embodied in hardware that is separate from, but in communication with, the processing unit(s) 200, the memory component(s), and the I/O component(s) 204, including the transceiver(s) 207, via the interconnect component(s) 206.

With reference to FIG. 2A, each of the I/O component(s) 204 may be configured to (e.g., at the direction of the processing unit(s) 200) receive inputs to the user device 100 and transmit outputs from the device 100. In addition, the transceiver(s) 207 may be configured to (e.g., at the direction of the processing unit(s) 200) transmit data to and receive data from other devices in communication with the user device 100. The interconnect component(s) 206 (e.g., a bus) may be configured to provide communication between the processing unit(s) 200, memory component(s) 202, the I/O component(s) 204 (including the transceiver(s) 207), and other systems or devices included in and/or outside the user device 100.

The units, components, and modules of the user device 100 described above may enable the device 100 to perform the techniques attributed to the device 100 in this disclosure. For example, the user device 100 (e.g., the processing unit(s) 200 executing instructions stored in the memory component(s) 202) may be configured to receive (e.g., via the I/O component(s) 204) a first user input 226A (e.g., a touchscreen finger contact and/or pressure input, or a mouse/trackpad cursor selection input) from a user 224 of the device 100. In this example, the first user input 226A may select an app icon displayed at the user device 100. For example, the app icon may be associated with a native app that is installed on the user device 100 (e.g., any of the native app(s) 212) and configured to, upon being selected, cause the device 100 to launch the app and set the app into a home state (e.g., a main GUI, or "screen") of the app. Accordingly, in response to receiving the first user input 226A from the user 224, the user device 100 (e.g., the processing unit(s) 200 executing instructions stored in the memory component(s) 202) may be configured to launch the native app and set the app into the home state.

The user device 100 (e.g., the processing unit(s) 200 executing instructions stored in the memory component(s) 202) may be further configured to receive (e.g., via the I/O component(s) 204) a second, different user input 226B (e.g., a touchscreen finger contact and/or pressure input, or a mouse/trackpad cursor selection input) from the user 224. In this example, the second user input 226B may be configured to set the native app into a state of the app other than the home state (e.g., a so-called "deeper" state, such as a state of the app that is reachable from the home state via one or more user interactions). For example, the second user input 226B may correspond to the user 224 interacting with (e.g., selecting one or more user-selectable GUI elements of) the home state of the app described above. As such, in response to receiving the second user input 226B from the user 224, the user device 100 (e.g., the processing unit(s) 200 executing instructions stored in the memory component(s) 202) may be configured to set the native app into the other state. Upon the native app being set into the other state, the user 224 may preview and/or interact with the state. For example, the user 224 may provide an app state interaction input 226C (e.g., a finger contact/pressure or cursor selection input) to the user device 100 configured to cause the native app to perform a function associated with the other state.

The user device 100 (e.g., the processing unit(s) 200 executing instructions stored in the memory component(s) 202) may also be configured to, in response to setting the native app into the other state, determine that the user 224 frequently sets the app into the other state. For example, as described herein, upon setting the native app into the other state, the user device 100 may determine that the device 100 has set the app into the other state a predetermined number of times (e.g., an "N" number of times, where N is a positive integer value). In some examples, as also described herein, upon setting the native app into the other state, the user device 100 further determines that the device 100 has set the app into the other state an N number of times over a predefined time period (e.g., a period of time having a duration of "M" time units, such as hours, days, weeks, or months, where M is also a positive integer value). In additional examples, to determine that the user 224 frequently sets the native app into the other state, the user device 100 may also determine one or more of that the device 100 has recently set the app into the other state (e.g., indicating that the user 224 still uses the other state) and that the device 100 has recently launched the app (e.g., indicating that the user 224 still uses the app).

The user device 100 (e.g., the processing unit(s) 200 executing instructions stored in the memory component(s) 202) may be configured to, in response to determining that the user 224 frequently sets the native app into the other state, configure the app icon to, upon being selected, cause the device 100 to launch the app and (e.g., automatically) set the app into the other state. For example, the user device 100 may configure the app icon to, upon being selected, cause the device 100 to launch the native app, set the app into the home state, and further set the app into the other state (e.g., while refraining from displaying a GUI associated with the home state to the user 224). In some examples, the user device 100 (e.g., the processing unit(s) 200 executing instructions stored in the memory component(s) 202) is further configured to receive (e.g., via the I/O component(s) 204) a third, different user input 226D (e.g., a touchscreen finger contact and/or pressure input, or a mouse cursor selection input) from the user 224 and configure the app icon in the manner described above based on the input 226D. For example, the third user input 226D may indicate to the user device 100 that the device 100 is to configure the app icon as described above. In additional examples, the user device 100 (e.g., the processing unit(s) 200 executing instructions stored in the memory component(s) 202) may also be configured to provide (e.g., via the I/O component(s) 204) a user prompt 228 (e.g., a visual, audible, and/or haptic output) to the user 224 configured to prompt the user 224 to provide the third user input 226D to the device 100. In these examples, the user device 100 may receive the third user input 226D from the user 224 in response to providing the user prompt 228. As one example, the user device 100 may provide the user prompt 228 and receive the third user input 226D in response to providing the prompt 228 upon launching the native app and setting the app into (e.g., provide the prompt 228 and receive the input 226D within) the home state. As another example, the user device 100 may provide the user prompt 228 and receive the third user input 226D in response to providing the prompt 228 upon launching the native app and setting the app into (e.g., provide the prompt 228 and receive the input 226D within) the other state. In additional examples, the user device 100 may provide the user prompt 228 and receive the third user input 226D in response to providing the prompt 228 in another setting (e.g., within a desktop GUI of the OS 208, a dashboard GUI, a launcher GUI, or other GUI of the device 100).

To perform one or more of receiving the first user input 226A, launching the native app and setting the app into the home state, receiving the second user input 226B, setting the app into the other state, determining that the user 224 frequently sets the app into the other state, providing the user prompt 228, receiving the third user input 226D, and configuring the app icon, the processing unit(s) 200 may execute one or more instructions included in the memory component(s) 202. For example, the processing unit(s) 200 may execute instructions associated with one or more of the OS 208, web browser app 210, native app(s) 212, launch state determination module 214, launch state configuration module 216, app state use detection module 218, user prompt module 220, and user input module 222. In a specific example, the processing unit(s) 200 may execute instructions that cause the user device 100 to run the OS 208.

To receive the first, second, and third user inputs 226A, 226B, and 226D from the user 224, the processing unit(s) 200 may execute instructions that cause the user device 100 to run a user input module (not shown), e.g., within the OS 208. In some examples, the user input module includes one or more of a finger contact input detection module and a pressure input detection module (e.g., configured to detect finger "taps" and/or finger or stylus "presses"). In other examples, the user input module may include a mouse/trackpad cursor selection detection module (e.g., configured to detect cursor "clicks" and/or "double-clicks"). In general, to receive the first, second, and third user inputs 226A, 226B, 226D, the user device 100 may run one or more of a web-based app, a native app, and a dedicated software module configured to receive finger contact and/or pressure inputs at a touchscreen of the device 100, and/or mouse/trackpad cursor selection inputs using a mouse or trackpad of the device 100.

To launch the native app, set the app into the home state, and set the app into the other state, the processing unit(s) 200 may execute instructions that cause the user device 100 to run one of the native app(s) 212 corresponding to the app, e.g., within the OS 208. For example, the user device 100 may launch the one of the native app(s) 212 in response to receiving the first user input 226A from the user 224. In this example, upon launching the one of the native app(s) 212, the user device 100 may further set the app 212 into the home state. Also in this example, in response to receiving the second user input 226B from the user 224, the user device 100 may further set the one of the native app(s) 212 into the other state. As shown in FIGS. 2A and B, to launch the native app, set the app into the home state, and further set the app into the other state, the user device 100 may interact with one of the API(s) 230 that corresponds to (e.g., includes data used by) the app. Specifically, as shown, the user device 100 may transmit one or more native app data requests 232 to (e.g., one or more commands for) the API 230 and receive native app (e.g., text and/or image) data 234 from the API 230 in response to transmitting the requests 232.

To determine that the user 224 frequently sets the native app into the other state, the processing unit(s) 200 may execute instructions that cause the user device 100 to run the launch state determination module 214, including the app state use detection module 218, e.g., within the OS 208. For example, the app state use detection module 218 may include instructions that, when executed by the processing unit(s) 200, cause the device 100 to determine whether the device 100 has set the native app into the other state a predetermined number of times, e.g., over a predefined time period. For instance, the user device 100 may determine whether the device 100 has set the native app into (e.g., accessed) the other state in a manner that meets or exceeds a predefined threshold frequency or rate value. In this example, the value may correspond to (e.g., be associate with) the other state being accessed frequently by users of the native app.

In additional examples, the launch state determination module 214, including the app state use detection module 218, may further include instructions that, when executed by the processing unit(s) 200, cause the user device 100 to determine one or more of whether the device 100 has recently set the native app into the other state and whether the device 100 has recently launched the app (e.g., irrespective of whether the device 100 subsequently set the app into the other state). In some examples, to determine that the user 224 frequently sets the native app into the other state, the user device 100 receives app state use data 236 from the one of the API(s) 230 associated with the app. For example, the app state use data 236 may indicate one or more used app states (e.g., one or more states of the native app that have been previously used by the user 224) and/or use frequency data (e.g., data indicating how frequently and/or recently the user 224 has used the states and/or the app). In these examples, the user device 100 may use the app state use data 236 to make the above-described determination.

To configure the app icon to, upon being selected, cause the user device 100 to launch the native app and set the app into the other state, the processing unit(s) 200 may execute instructions that cause the device 100 to run the launch state configuration module 216, e.g., within the OS 208. As one example, the launch state configuration module 216 may include instructions that, when executed by the processing unit(s) 200, cause the user device 100 to configure the app icon to, upon being selected, cause the device 100 to launch the native app, set the app into the home state, and further set the app into the other state (e.g., while refraining from displaying a GUI of the home state to the user 224). To perform the above-described steps, the user device 100 may determine (e.g., generate) one or more operations and cause the native app to perform the operations, as described in greater detail below. As another example, the launch state configuration module 216 may include instructions that, when executed by the processing unit(s) 200, cause the user device 100 to configure the app icon to, upon being selected, cause the device 100 to launch the native app and set the app directly into the other state. To perform the above-described steps, the user device 100 may determine (e.g., generate) an access mechanism (AM) (e.g., a uniform resource locator (URL)) and provide the AM to the native app, as also described below.

As described herein, the user device 100 may configure the app icon in the manner described above in response to determining that the user 224 frequently sets the native app into the other state and based on the third user input 226D received from the user 224, e.g., in response to providing the user prompt 228. To configure the app icon as described above based on the third user input 226D, the processing unit(s) 200 may execute instructions that cause the user device 100 to run the user input module 222 of the launch state configuration module 216, e.g., within the OS 208. For example, the user input module 222 may include instructions that, when executed by the processing unit(s) 200, cause the user device 100 to configure the app icon in the manner described herein upon the device 100 receiving the third user input 226D. To provide the user prompt 228 to the user 224, the processing unit(s) 200 may execute instructions that cause the user device 100 to run the user prompt module 220 of the launch state configuration module 216, e.g., also within the OS 208. For example, the user prompt module 220 may include instructions that, when executed by the processing unit(s) 200, cause the device 100 to output visual (e.g., a GUI), audible (e.g., a sound tone and/or a voice command), and/or haptic (e.g., a vibration) output to the user 224. In other examples, to provide the user prompt 228, the processing unit(s) 200 may execute instructions that cause the user device 100 to run any of the web browser app 210, native app(s) 212, and a GUI, sound, and/or vibration output module (not shown). In general, to provide the user prompt 228 and receive the third user input 226D, the user device 100 may run one or more of a web-based app, a native app, and a dedicated software module configured to generate a visual, audible, and/or haptic output to the user 224 and receive the input 226D from the user 224 of the device 100.

FIGS. 3A-5B illustrate example GUIs that may be generated on a user device 100 according to this disclosure. The user device 100 shown in FIGS. 3A-5B is a smartphone computing device. Example smartphone computing devices include the SAMSUNG S® devices by Samsung Electronics Co., Ltd. and the APPLE IPHONE® devices by Apple Inc. In other examples, the user device 100 may be a wrist watch computing device (e.g., a smart watch). Example wrist watch computing devices include the SAMSUNG GALAXY GEAR®, SAMSUNG GALAXY GEAR® 2, SAMSUNG GEAR® 2 Neo, and SAMSUNG GEAR FIT® by Samsung Electronics Co., Ltd., as well as the APPLE WATCH® by Apple Inc. In still other examples, the user device 100 may be another computing device having another form factor.

As shown in FIG. 3A, initially, the user device 100 receives a first user input 226A from a user 224 of the device 100. For example, the user device 100 may receive the first user input 226A from the user 224 via a finger contact and/or pressure input (e.g., using a touchscreen of the device 100), a cursor selection input (e.g., using an integrated or peripheral mouse or trackpad of the device 100), or using another user input technique. As also shown, the first user input 226A selects an app icon that is displayed at (e.g., a display screen 102 of) the user device 100 (e.g., within a desktop GUI 300A of an OS 208 of the device 100 displayed using the screen 102). As described herein, the app icon is associated with a native app (e.g., one of the native app(s) 212) that is installed on the user device 100. In the example of FIGS. 3A-5B, the native app associated with the selected app icon is "TripAdvisor®" by TripAdvisor, LLC (hereinafter, "TripAdvisor"), which is installed on the user device 100. As also described herein, the app icon is configured to, upon being selected, cause the user device 100 to launch TripAdvisor and set TripAdvisor into a home state (e.g., a main GUI, or screen). Accordingly, as shown in FIG. 3B, in response to receiving the first user input 226A, the user device 100 launches TripAdvisor and sets TripAdvisor into the home state. As also shown, the home state of TripAdvisor corresponds to a home state GUI 300B of TripAdvisor displayed using the display screen 102.

As shown in FIG. 3B, the user device 100 further receives a second, different user input 226B from the user 224. For example, the user device 100 may receive the second user input 226B from the user 224 via any of the techniques described above with reference to the first user input 226A. As described herein, the second user input 226B is configured to set TripAdvisor into a state of TripAdvisor other than the home state (e.g., a deeper state). Accordingly, as shown in FIG. 3C, in response to receiving the second user input 226B, the user device 100 sets TripAdvisor into the other state. As also shown, the other state of TripAdvisor corresponds to a GUI 300C of TripAdvisor displayed using the display screen 102. Upon the user device 100 setting TripAdvisor into the other state depicted in FIG. 3C, the user 224 may preview and/or interact with the state. For example, as shown in FIG. 3C, the user 224 may provide an app state interaction input 226C (e.g., a touchscreen finger contact and/or pressure input, or a mouse/trackpad cursor selection input) to the user device 100 configured to cause TripAdvisor to perform a function associated with the other state. In some examples, the user 224 further bookmarks the other state, as indicated by the bookmark GUI element 402.

As described herein, in response to setting TripAdvisor into the other state, the user device 100 may determine that the user 224 frequently sets TripAdvisor into the other state. As also described herein, in response to making this determination (and, e.g., based on a third user input 226D also received from the user 224), the user device 100 may configure the app icon selected by the first user input 226A to, upon being selected, cause the device 100 to launch TripAdvisor and set TripAdvisor into the other state.

FIGS. 4A-4C illustrate examples in which the user device 100 provides a user prompt 228A, 228B, and 228C to the user 224 and receives a third user input 226D from the user 224 in response to providing the prompt 228A-228C. As described herein, the user device 100 may use the third user input 226D to configure the app icon selected by the first user input 226A to, upon being selected, cause the device 100 to launch TripAdvisor and set TripAdvisor into the other state. In the example of FIGS. 4A-4C, the user prompt 228A-228C is a visual output (e.g., a GUI element including text and/or image data) configured to prompt the user 224 to provide the third user input 226D to the user device 100. In other examples, the user prompt 228A-228C may include any combination of a visual, audible, and haptic output. As shown in each of FIGS. 4A-4C, initially, the user device 100 provides the user prompt 228A-228C to the user 224 (i.e., displays the GUI element) at the display screen 102. As shown, the user device 100 may provide the user prompt 228A within the desktop GUI 300A of the OS 208 of the device 100, the user prompt 228B within the home state GUI 300B of TripAdvisor, and the user prompt 228C within the other state GUI 300C of TripAdvisor. In other examples, the user device 100 may provide the user prompt 228A-228C in another setting (e.g., in a dashboard GUI, a launcher GUI, or another GUI of the device 100). As further shown, upon (e.g., in response to) providing the user prompt 228A-228C to the user 224 in any of the desktop, home state, and other state GUIs 300A-300C, the user device 100 receives the third user input 226D from the user 224.

Figure 5B:
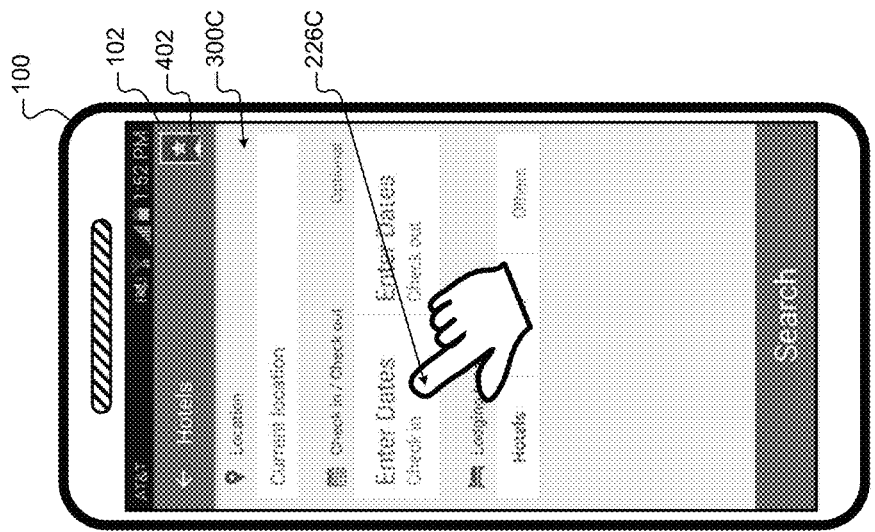
Figure 5A:
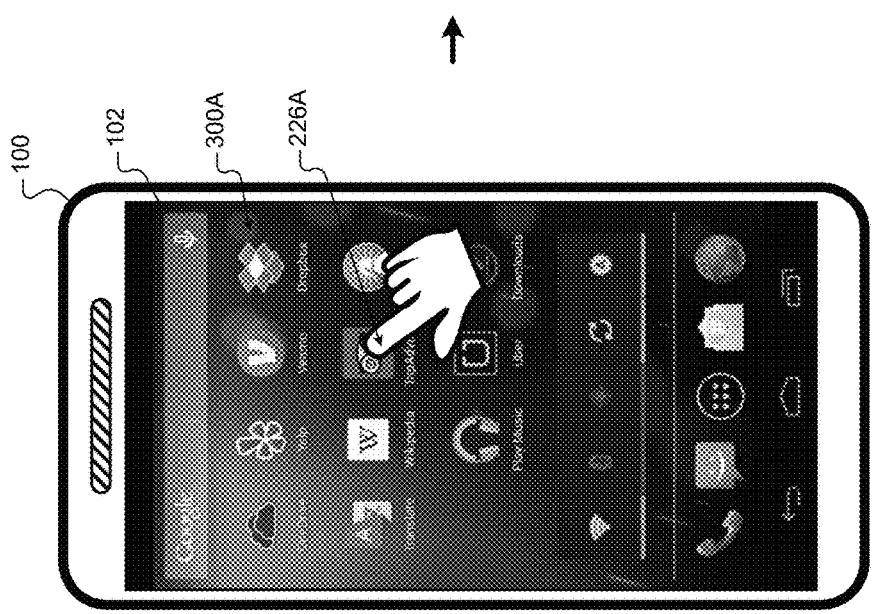

FIGS. 5A-5B illustrate examples in which the user device 100 launches TripAdvisor and sets TripAdvisor into the other state in response to receiving the first user input 226A that selects the app icon configured in the manner described herein. As shown in FIG. 5A, initially, the user device 100 receives the first user input 226A selecting the app icon from the user 224, in a similar manner as described above with reference to FIGS. 3A-3C. As shown in FIG. 5B, in response to receiving the first user input 226A, the user device 100 launches TripAdvisor and sets TripAdvisor into the other state. In this example, the user device 100 may have previously configured the app icon to, upon being selected, cause the device 100 to launch TripAdvisor and set TripAdvisor into the other state, as described herein.

Figure 6:
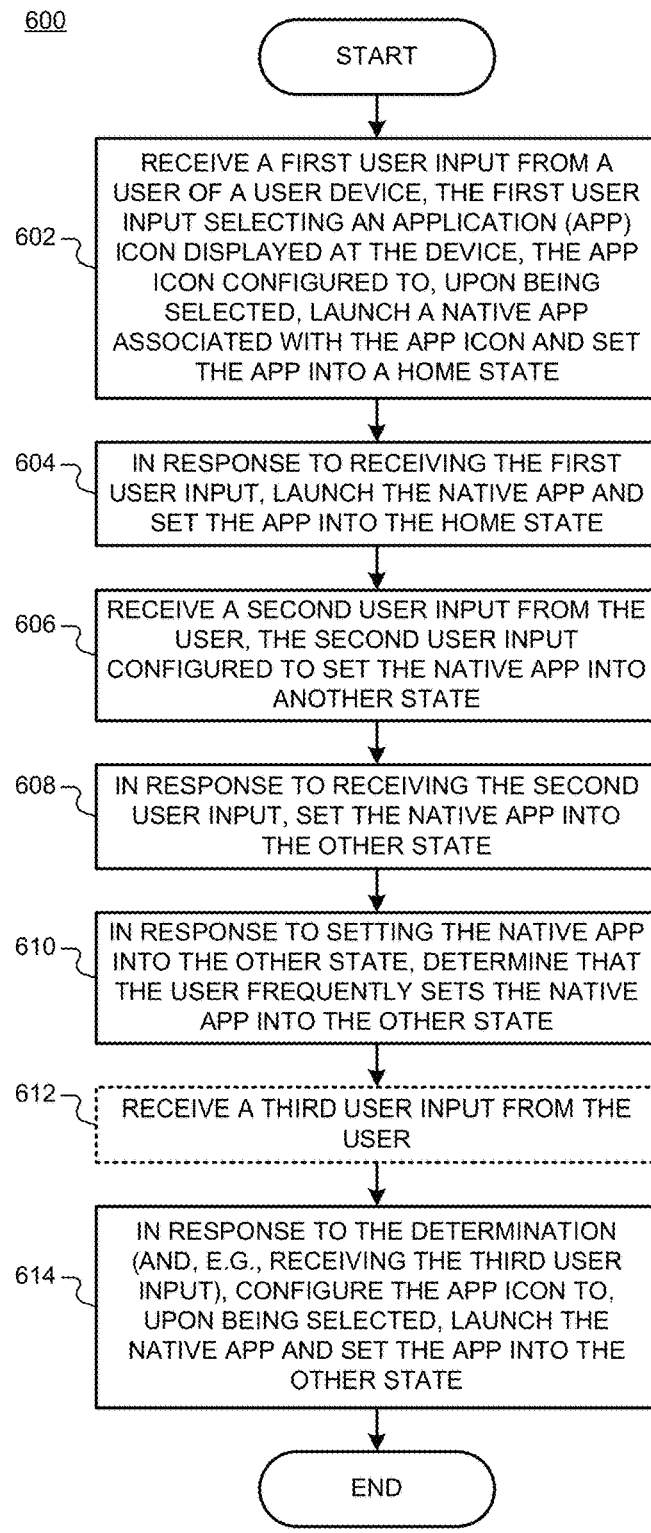
FIGS. 6-7C are flow diagrams that illustrate example methods for setting a personalized launch state of a native app based on one or more of user behavior and a user input.
Figure 7A:
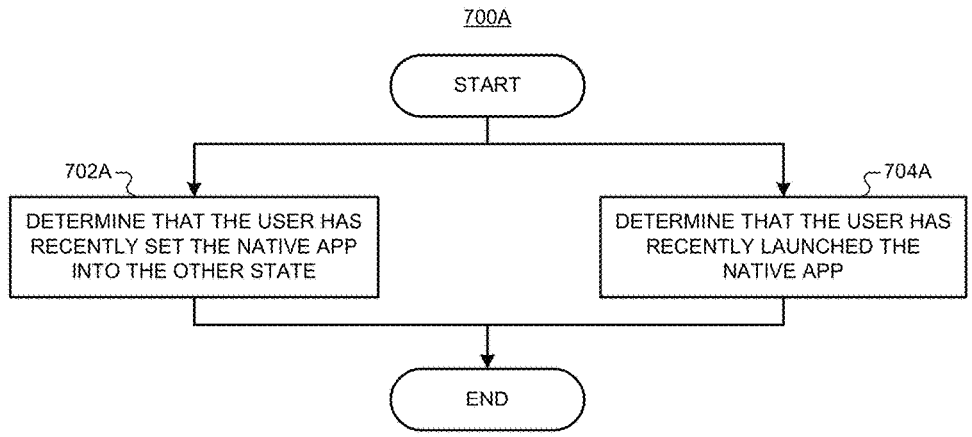
Figure 7B:
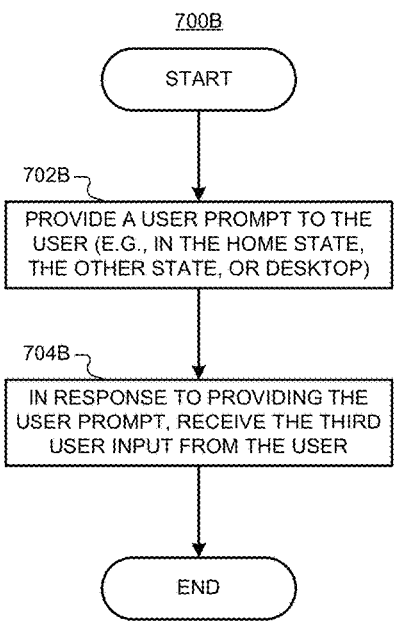
Figure 7C:
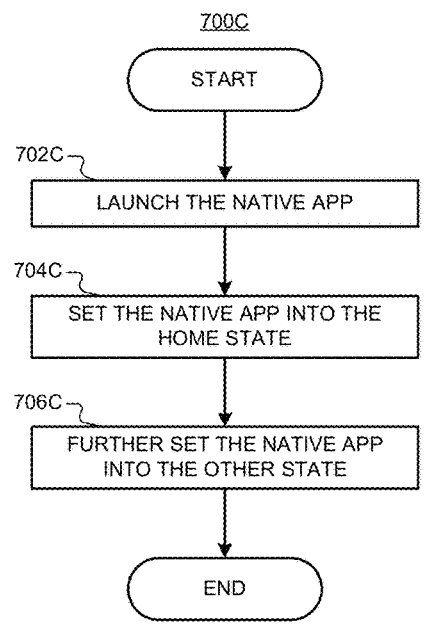

FIGS. 6-7C are flow diagrams that illustrate example methods 600-700C, respectively, for setting a personalized launch state of a native app based on user behavior and/or a user input. With reference to the method 600 of FIG. 6, in block 602, a user device 100 initially receives a first user input 226A (e.g., a touchscreen finger contact and/or pressure input, or a mouse/trackpad cursor selection input) from a user 224 of the device 100. As described herein, the first user input 226A selects an app icon displayed at (e.g., a display screen 102 of) the user device 100. As also described herein, the app icon is associated with a native app that is installed on the user device 100 and configured to, upon being selected, cause the device 100 to launch the app and set the app into a home state (e.g., a main GUI, or screen) of the app. In block 604, in response to receiving the first user input 226A, the user device 100 launches the native app and sets the app into the home state. In block 606, the user device 100 receives a second, different user input 226B (e.g., a finger contact and/or pressure input, or a cursor selection input) from the user 224. As described herein, the second user input 226B is (e.g., a user interaction with the home state) configured to set the native app into a state of the app other than the home state (e.g., a deeper state). In block 608, in response to receiving the second user input 226B, the user device 100 sets the native app into the other state. In block 610, in response to setting the native app into the other state, the user device 100 determines that the user 224 frequently sets the app into the other state. As described herein, to make this determination, the user device 100 may determine that the device 100 (e.g., at the direction of the user 224) has set the native app into the other state a predetermined (e.g., threshold) number of times, e.g., over a predefined time period. Additionally, in some examples, with reference to FIG. 7A and method 700A, the user device 100 further determines that the user 224 has recently (e.g., within the last day, week, or month) set the native app into the other state and/or that the user 224 has recently (e.g., within the last day, week, or month) launched the app, as shown in blocks 702A and 704A.

As described below, upon determining that the user 224 frequently sets the native app into the other state, the user device 100 configures the app icon selected by the first user input 226A to, upon being selected, cause the device 100 to launch the app and (e.g., automatically) set the app into the other state. In some examples, as shown in block 612, the user device 100 optionally receives a third, different user input 226D (e.g., a finger contact and/or pressure input, or a cursor selection input) from the user 224 and configure the app icon in the manner described above in response to receiving the input 226D. In these examples, with reference to FIG. 7B and method 700B, the user device 100 may initially provide a user prompt 228 (e.g., a visual, audible, and/or haptic output) to the user 224, as shown in block 702B. The user prompt 228 may be configured to cause the user 224 to provide the third user input 226D to the user device 100. As shown in block 704B, the user device 100 may then receive the third user input 226D from the user 224 in response to providing the user prompt 228.

In any case, in block 614, the user device 100 may, in response to determining that the user 224 frequently sets the native app into the other state (and, e.g., in response to receiving the third user input 226D), configure the app icon to, upon being selected, cause the device 100 to launch the app and set the app into the other state. In some examples, to configure the app icon in this manner, the user device 100 determines (e.g., generates) one or more operations for the native app to perform. In this example, the native app performing the operations sets the app into the other state. For example, the native app performing the operations may cause the app to, upon being launched and set into the home state, be further set into the other state (e.g., while refraining from displaying a GUI of the home state to the user 224). The user device 100 may configure the app icon to, upon being selected, launch the app and cause the app to perform the operations. As such, with reference to FIG. 7C and method 700C, the user device 100 may configure the app icon to, upon being selected, cause the device 100 to launch the native app, as shown in block 702C, set the app into the home state, as shown in block 704C, and further set the app into the other state, as shown in block 706C. In other examples, to configure the app icon, the user device 100 may determine (e.g., generate) an AM (e.g., a URL) that, upon being received by the native app, sets the app directly into the other state. The user device 100 may configure the app icon to, upon being selected, launch the native app and transmit the AM to the app.

Figure 8A:
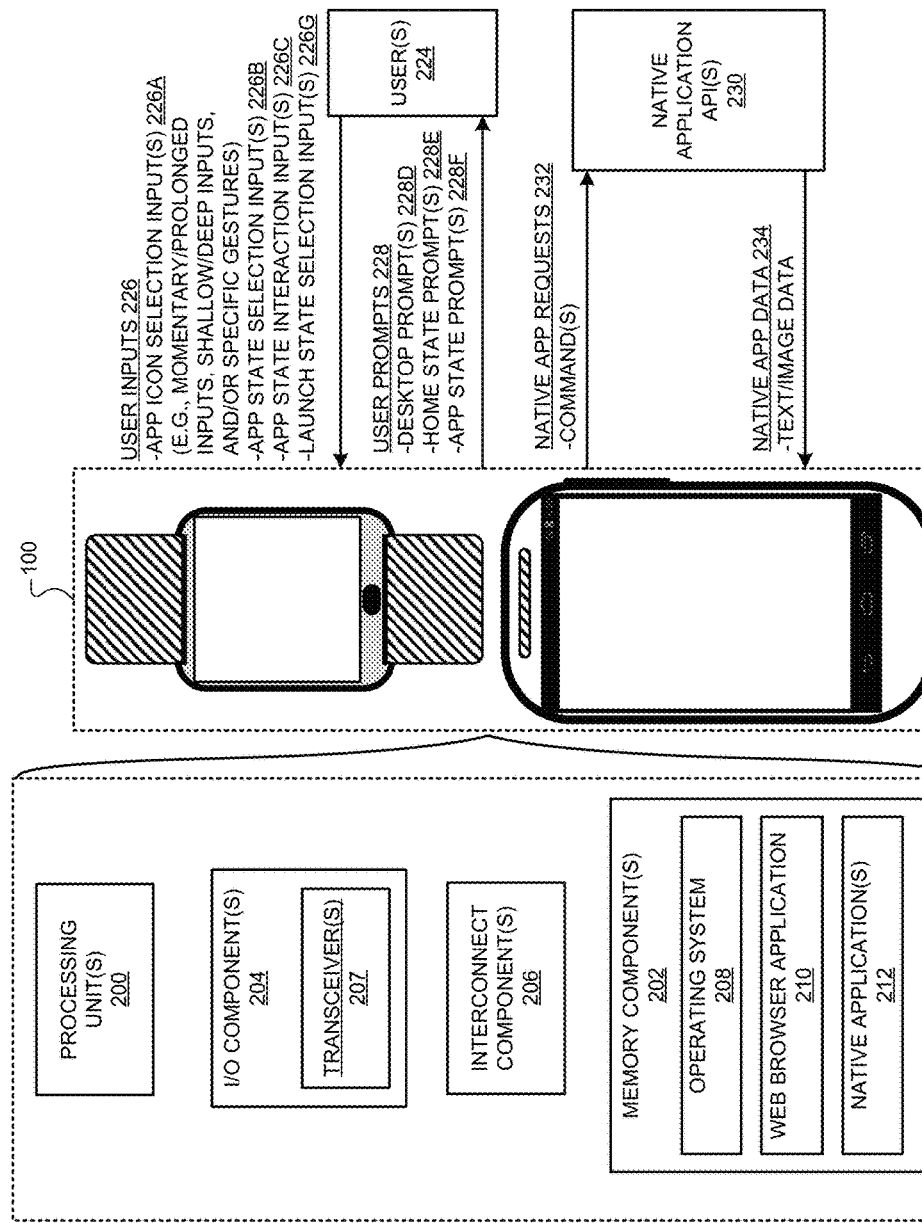
FIGS. 8A-8B are additional functional block diagrams of an example user device in communication with one or more of a user and an API.
Figure 8B:
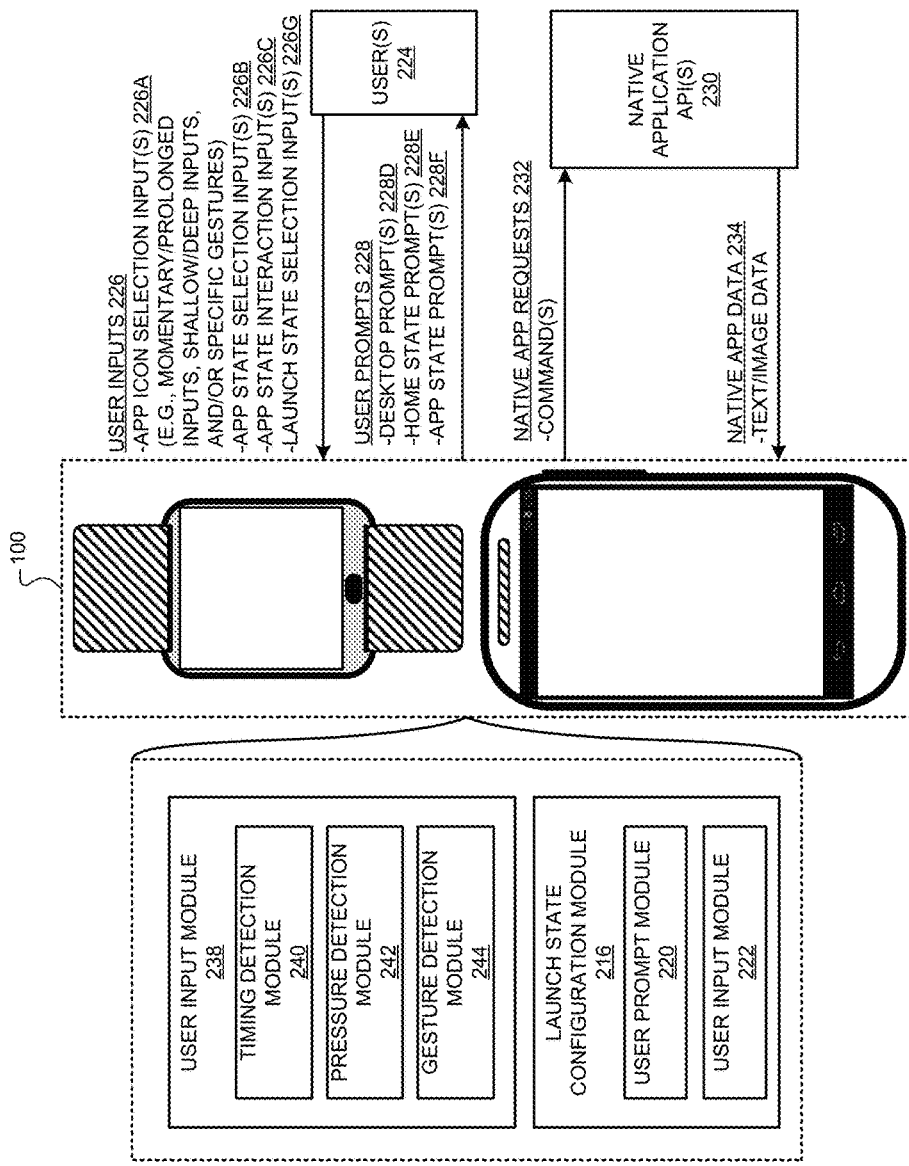

FIGS. 8A and 8B are additional functional block diagrams of an example user device 100 in communication with one or more users 224 and API(s) 230. The example of FIGS. 8A and 8B includes some of the same elements and user interactions as described above with reference to FIGS. 2A and 2B. In the example of FIG. 8, the memory component(s) 202 store the OS 208, web browser app 210, and native app(s) 212. As shown in FIG. 8B, the user device 100 includes a launch state configuration module 216, as well as a user input module 238. As shown in FIG. 8B, the user input module 238 includes a timing detection module 240, a pressure detection module 242, and a gesture detection module 244. The modules may be implemented by and embodied in electronic hardware, software, firmware, and/or any combination thereof. For example, one or more of the user input module 238, timing detection module 240, pressure detection module 242, gesture detection module 244, launch state configuration module 216, user prompt module 220, and user input module 222 may be implemented by and embodied in computer-executable instructions stored in the memory component(s) 202 and executed by the processing unit(s) 200. Alternatively, one or more of the user input module 238, timing detection module 240, pressure detection module 242, gesture detection module 244, launch state configuration module 216, user prompt module 220, and user input module 222 may be, in whole or in part, implemented by and embodied in hardware that is separate from, but in communication with, the processing unit(s) 200, the memory component(s), and the I/O component(s) 204, including the transceiver(s) 207, via the interconnect component(s) 206.

In the example of FIGS. 8A and 8B, the user device 100 (e.g., the processing unit(s) 200 executing instructions stored in the memory component(s) 202) may be configured to receive (e.g., via the I/O component(s) 204) a user input 226A (e.g., a touchscreen finger contact and/or pressure input, or a mouse cursor selection input) from a user 224 of the device 100. In this example, the user input 226A may select an app icon displayed at the user device 100. For example, the app icon may be associated with a native app that is installed on the user device 100 (e.g., any of the native app(s) 212). The user device 100 (e.g., the processing unit(s) 200 executing instructions stored in the memory component(s) 202) may also be configured to, in response to receiving the user input 226A, determine that the input 226A corresponds to one of a first user input type 226E (shown in FIGS. 9A-9C) and a second user input type 226F (shown in FIGS. 9A-9C). As one example, the user device 100 may determine whether the user input 226A is a momentary input having a relatively short time duration, or a prolonged input having a relatively longer time duration. As another example, the user device 100 may determine whether the user input 226A is a shallow input having a relatively small depression depth with respect to a pressure-sensitive display screen (e.g., the display screen 102) of the device 100, or a deep input having a relatively large depression depth with respect to the screen. As still another example, the user device 100 may determine whether the user input 226A is a first user gesture with respect to the display screen 102 of the device 100, or a second, different user gesture with respect to the screen 102.

The user device 100 (e.g., the processing unit(s) 200 executing instructions stored in the memory component(s) 202) may be further configured to, when the user input 226A corresponds to the first user input type 226E, launch the native app and set the app into a home state (e.g., main GUI, or screen) of the app. The user device 100 (e.g., the processing unit(s) 200 executing instructions stored in the memory component(s) 202) may be still further configured to, when the user input 226A corresponds to the second user input type 226F, launch the native app and set the app into a state of the app other than the home state (e.g., a deeper state than the home state). As a specific example, the user device 100 may be configured to, when the user input 226A corresponds to the first user input type 226E, launch a native messaging app and set the app into a default state, or a last-used state, of the app. In this example, the user device 100 may be configured to, when the user input 226A corresponds to the second user input type 226F, launch the app and set the app into a different state that enables the user to send a message (e.g., by further specifying the message and a recipient). As another specific example, the user device 100 may be configured to, when the user input 226A corresponds to the first user input type 226E, launch a native restaurant or travel app and set the app into a default state, or a last-used state of the app. In this example, the user device 100 may be configured to, when the user input 226A corresponds to the second user input type 226F, launch the app and set the app into a different state that enables the user to perform a search for restaurants, hotels, or auto rentals (e.g., by further specifying a search query).

In some examples, to launch the native app and set the app into the other state, the user device 100 (e.g., using one or more operations) may launch the app, set the app into the home state, and further set the app into the other state (e.g., while refraining from displaying a GUI of the home state to the user 224). In other examples, to launch the native app and set the app into the other state, the user device 100 may launch the app and set the app directly into the other state (e.g., using an AM, such as a URL).

In some examples, the user device 100 (e.g., the processing unit(s) 200 executing instructions stored in the memory component(s) 202) is further configured to receive (e.g., via the I/O component(s) 204) a second, different user input 226G (e.g., a touchscreen finger contact and/or pressure input, or a mouse cursor selection input) from the user 224. For example, the second user input 226G may specify a state of the native app. In these examples, the user device 100 may, in response to receiving the second user input 226G, set the state specified by the input 226G as the other state. In other examples, the user device 100 (e.g., the processing unit(s) 200 executing instructions stored in the memory component(s) 202) may also be configured to provide (e.g., via the I/O component(s) 204) a user prompt 228 (e.g., a visual, audible, and/or haptic output) to the user 224 configured to prompt the user 224 to provide the second user input 226G to the device 100. In these examples, the user device 100 may receive the second user input 226G from the user 224 in response to providing the user prompt 228. As one example, the user device 100 may provide the user prompt 228 and receive the second user input 226G in response to providing the prompt 228 upon launching the native app and setting the app into (e.g., provide the prompt 228 and receive the input 226G within) the home state. As another example, the user device 100 may provide the user prompt 228 and receive the second user input 226G in response to providing the prompt 228 upon launching the native app and setting the app into (e.g., provide the prompt 228 and receive the input 226G within) the other state. In additional examples, the user device 100 may provide the user prompt 228 and receive the second user input 226G in response to providing the prompt 228 in another setting (e.g., in a desktop GUI of the OS 208, a dashboard GUI, a launcher GUI, or other GUI of the device 100).

To perform one or more of receiving the user input 226A, determining that the input 226A corresponds to the first or second user input types 226E, 226F, launching the native app, setting the app into the home state, setting the app into the other state, providing the user prompt 228, and receiving the second user input 226G, the processing unit(s) 200 may execute one or more instructions included in the memory component(s) 202. For example, the processing unit(s) 200 may execute instructions associated with one or more of the OS 208, web browser app 210, native app(s) 212, launch state configuration module 216, user prompt module 220, user input module 222, user input module 238, timing detection module 240, pressure detection module 242, and gesture detection module 244. In a specific example, the processing unit(s) 200 may execute instructions that cause the user device 100 to run the OS 208. To receive the user input 226A and the second user input 226G, the processing unit(s) 200 may execute instructions that cause the user device 100 to run a user input module (not shown), in a similar manner as described above with reference to FIGS. 2A and 2B. To launch the native app, set the app into the home state, and set the app into the other state, the processing unit(s) 200 may execute instructions that cause the user device 100 to run one of the native app(s) 212 corresponding to the app, also in a similar manner as described above with reference to FIGS. 2A and 2B.

To determine that the user input 226A corresponds to the first or second user input types 226E, 226F, the processing unit(s) 200 may execute instructions that cause the user device 100 to run one or more of the timing detection module 240, pressure detection module 242, and gesture detection module 244, e.g., within the OS 208. As one example, the timing detection module 240 may include instructions that, when executed by the processing unit(s) 200, cause the user device 100 to determine that the user input 226A is a momentary or prolonged user input, as described herein. For example, to make this determination, the user device 100 may determine whether the user input 226A has a time duration that exceeds a predefined threshold time duration. As another example, the pressure detection module 242 may include instructions that, when executed by the processing unit(s) 200, cause the user device 100 to determine that the user input 226A is a shallow or deep user input, as also described herein. For example, to make this determination, the user device 100 may determine whether the user input 226A is associated with a pressure amount (e.g., measured using force and/or touchscreen deflection) that exceeds a predefined threshold pressure amount. As still another example, the gesture detection module 244 may include instructions that, when executed by the processing unit(s) 200, cause the user device 100 to determine that the user input 226A is one of two different user gestures (e.g., a motion that selects the app icon, and a motion that encircles the icon).

As described herein, the user device 100 may receive the second user input 226G from the user 224 and, in response to receiving the input 226G, set the state specified by the input 226G as the other state. As also described herein, the user device 100 may initially provide the user prompt 228 to the user 224, and subsequently receive the second user input 226G from the user 224 in response to providing the prompt 228. To transmit the user prompt 228 and receive the second user input 226G, the processing unit(s) 200 may execute instructions that cause the user device 100 to run the user prompt module 220 and user input module 222 (e.g., within the OS 208), also in a similar manner as described above with reference to FIGS. 2A and 2B. In general, to provide the user prompt 228 and receive the second user input 226G, the user device 100 may run one or more of a web-based app, a native app, and a dedicated software module configured to generate a visual, audible, and/or haptic output to the user 224 and receive the input 226G from the user 224 of the device 100. In still other examples, the user device 100 may automatically set a state of the native app that is frequently accessed by the user 224 (e.g., by the user device 100 at the direction of the user 224) as the other state, in a similar manner as described above with reference to FIGS. 2A and 2B.

FIGS. 9A-9C illustrate additional example GUIs that may be generated on a user device 100 according to this disclosure. The example of FIGS. 9A-9C includes some of the same elements and user interactions as described above with reference to FIGS. 3A-3C. As shown in FIG. 9A, initially, the user device 100 receives a user input 226A from the user 224 of the device 100. For example, the user device 100 may receive the user input 226A from the user 224 using any of the techniques described above with reference to FIGS. 3A-3C. As also shown, the user input 226A selects an app icon associated with a native app installed on the user device 100 and displayed at the device 100, in a similar manner as described above with reference to FIGS. 3A-3C. In this example, the native app associated with the app icon selected by user input 226A is TripAdvisor, which is installed on the user device 100.

As shown in FIGS. 9A-9C, in response to receiving the user input 226A, the user device 100 determines that the input 226A corresponds to one of a first user input type 226E and a second user input type 226F (e.g., one of a momentary, prolonged, shallow, and deep input, or a specific user gesture). As shown in FIG. 9B, when the user input 226A corresponds to the first user input type 226E, the user device 100 launches TripAdvisor and sets TripAdvisor into the home state. Alternatively, as shown in FIG. 9C, when the user input 226A corresponds to the second user input type 226F, the user device 100 launches TripAdvisor and sets TripAdvisor into the other state. In this example, upon the user device 100 setting TripAdvisor into the home or other state, as depicted in FIGS. 9B and 9C, respectively, the user 224 may preview and/or interact with the home or other state. For example, as shown in FIGS. 9B-9C, the user 224 may provide an app state selection input 226B or an app state interaction input 226C to the user device 100 configured to cause TripAdvisor to be set into a state other than the home state (e.g., the other state) or perform a function associated with the other state.

As described herein, in some examples, the user device 100 further receives (e.g., in response to providing a user prompt 228 to the user 224) a second, different user input 226G from the user 224. The second user input 226G may specify a (e.g., personalized launch) state of TripAdvisor. In these examples, the user device 100 may, in response to receiving the second user input 226G, set the state specified by the input 226G as the other state.

FIGS. 10A-10C illustrate examples in which the user device 100 provides a user prompt 228D, 228E, and 228F to the user 224 and receives a second user input 226G from the user 224 in response to providing the prompt 228D-228F. As described herein, the user device 100 may use the second user input 226G to set the state of TripAdvisor specified by the input 226G as the other state. In this example, the user prompt 228D-228F is a visual output (e.g., a GUI element including text and image data) configured to prompt the user 224 to provide the second user input 226G to the user device 100. In other examples, the user prompt 228D-228F may include any combination of a visual, audible, and haptic output. As shown in each of FIGS. 10A-10C, initially, the user device 100 provides the user prompt 228D-228F to the user 224 (i.e., displays the GUI element) at the display screen 102. As shown, the user device 100 may provide the user prompt 228D within the desktop GUI 300A of the OS 208 of the device 100, the user prompt 228E within the home state GUI 300B of TripAdvisor, and the user prompt 228F within the other state GUI 300C of TripAdvisor. In other examples, the user device 100 may provide the user prompt 228D-228F in another setting (e.g., in a dashboard GUI, a launcher GUI, or another GUI of the device 100). As further shown, upon (e.g., in response to) providing the user prompt 228D-228F to the user 224 in any of the desktop, home state, and other state GUIs 300A-300C, the user device 100 receives the second user input 226G from the user 224.

Figure 11:
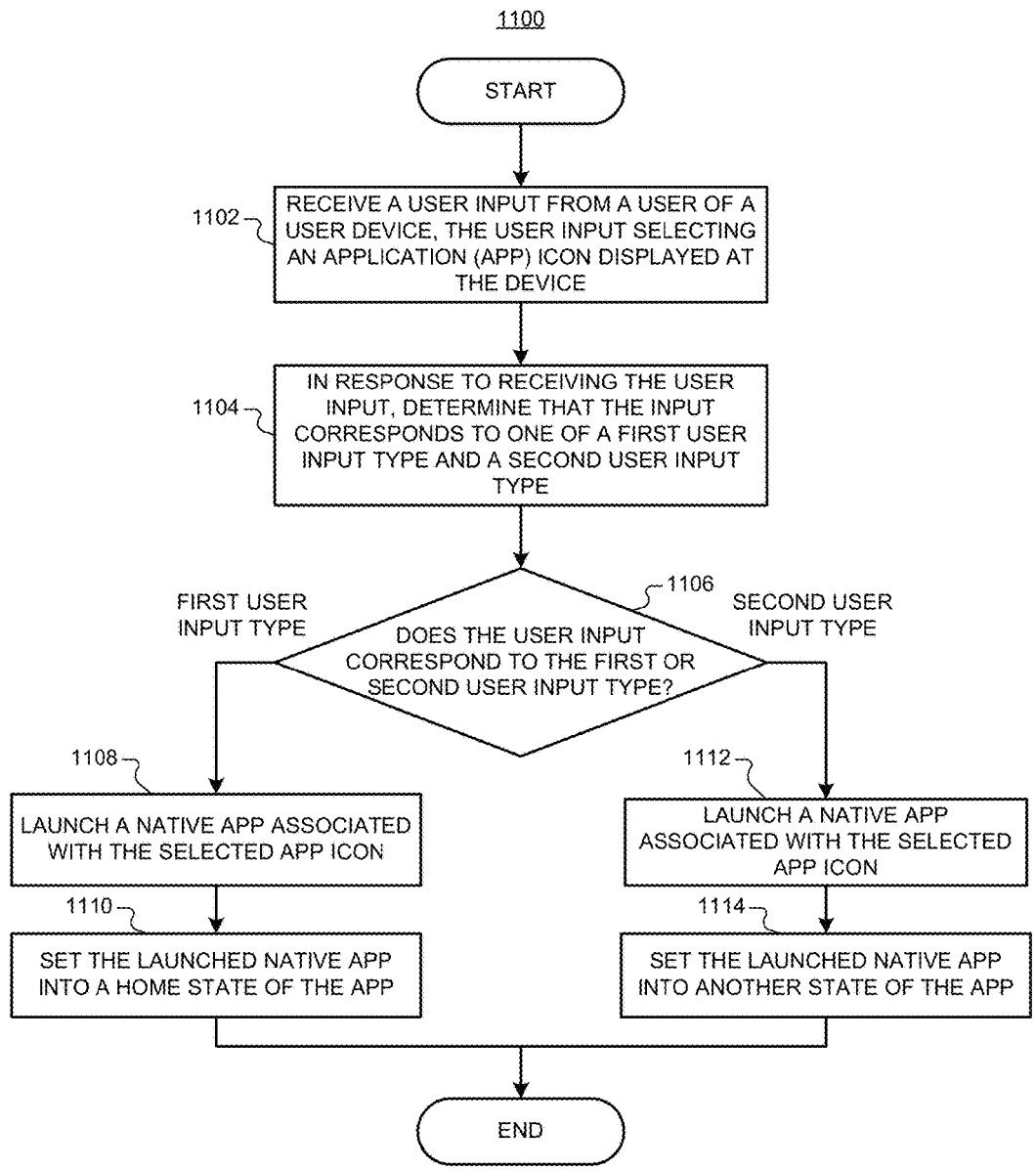

FIGS. 11-12B are flow diagrams that illustrate example methods 1100-1200B, respectively, for launching a native app and accessing one of a home state and a personalized launch state of the app in response to receiving a user input. With reference to FIG. 11 and method 1100, in block 1102, a user device 100 initially receives a user input 226A (e.g., a touchscreen finger contact and/or pressure input, or a mouse/trackpad cursor selection input) from a user 224 of the device 100. As described herein, the user input 226A may select an app icon displayed at (e.g., a display screen 102 of) the user device 100. As also described herein, the app icon may be associated with a native app that is installed on the user device 100. In block 1104, in response to receiving the user input 226A, the user device 100 determines that the input 226A corresponds to one of a first user input type 226E and a second user input type 226F. As one example, to determine that the user input 226A corresponds to the first or second user input type 226E, 226F, the user device 100 may determine that the input 226A corresponds to a momentary input having a relatively short time duration, or a prolonged input having a relatively longer time duration. As another example, to determine that the user input 226A corresponds to the first or second user input type 226E, 226F, the user device 100 may determine that the input 226A corresponds to a shallow input having a relatively small depression depth with respect to a pressure-sensitive display screen (e.g., the display screen 102) of the device 100, or a deep input having a relatively large depression depth with respect to the screen. As still another example, to determine that the user input 226A corresponds to the first or second user input type 226E, 226F, the user device 100 may determine that the input 226A corresponds to a first user gesture or a second, different gesture with respect to the display screen 102 of the device 100. As one example, the first user gesture may correspond to a motion that selects (e.g., touches, presses, or clicks) the app icon on the display screen 102. As another example, the second user gesture may correspond to a motion that fully or partially encircles the app icon on the display screen 102, or another motion.

In block 1106, when the user input 226A corresponds to the first user input type 226E ("FIRST USER INPUT TYPE" prong of block 1106), the user device 100, at block 1108, may launch the native app and set the app into a home state (e.g., a main GUI, or screen) of the app at block 1110. Alternatively, when the user input 226A corresponds to the second user input type 226E ("SECOND USER INPUT TYPE" prong of block 1106), the user device 100 may launch the native app at block 1112, and set the app into a state of the app other than the home state (e.g., a deeper state) at block 1114. In some examples, the app icon selected by the user input 226A is configured to, upon being selected, cause the user device 100 to launch the native app and set the app into the home state. In these examples, with reference to FIG. 12A and method 1200A, to launch the native app and set the app into the other state when the user input 226A corresponds to the second user input type 226F, the user device 100 may launch the app, as shown in block 1202A, set the app into the home state, as shown in block 1204A, and further set the app into the other state, as shown in block 1206A (e.g., while refraining from displaying a GUI of the home state to the user 224). For example, the user device 100 may determine (e.g., generate) one or more operations for the native app to perform. The native app performing the operations sets the app into the other state. Specifically, the native app performing the operations causes the native app to, upon being launched and set into the home state, be further set the into the other state (e.g., while refraining from displaying the GUI of the home state to the user 224). The user device 100 may, when the user input 226A corresponds to the second user input type 226F, launch the native app, set the app into the home state, and cause the app to perform the operations. In other examples, to launch the native app and set the app into the other state when the user input 226A corresponds to the second user input type 226F, the user device 100 may configure the app icon to, upon being selected, cause the device 100 to launch the app and set the app directly into the other state. For example, the user device 100 may determine (e.g., generate) an AM (e.g., a URL) configured to, upon being received by the native app, set the app directly into the other state. The user device 100 may, when the user input 226A corresponds to the second user input type 226F, launch the native app and transmit the AM (e.g., URL) to the app.

In some examples, the user device 100 further receives a second, different user input 226G (e.g., a finger contact and/or pressure input, a cursor selection input, or another input, such as a text or voice input) from the user 224. In these examples, the second user input 226G may specify (e.g., select) a state of the native app (e.g., a deeper state than the home state). For example, the user 224 may provide the second user input 226G specifying (e.g., selecting) the state of the native app while the app is set into the specified state (e.g., upon the user device 100 setting the app into the state). In these examples, in response to receiving the second user input 226G, the user device 100 may set the state specified by the input 226G as the other state. In other words, in these examples, the user 224 may specify a particular state of the native app as the other state into which the app is set when the user input 226A corresponds to the second user input type 226F. In some examples, to receive the second user input 226G from the user 224, the user device 100 provides a user prompt 228 (e.g., a visual, audible, and/or haptic output) to the user 224 and receive the input 226G from the user 224 in response to providing the user prompt 228. The user prompt 228 may be configured to cause the user 224 to provide the second user input 226G to the user device 100. For example, the user device 100 may provide the user prompt 228 and receive the second user input 226G upon launching the native app and setting the app into (e.g., provide the prompt 228 and receive the input 226G within) the home state, (e.g., provide the prompt 228 and receive the input 226G within) the state specified by the input 226G, or in another setting (e.g., in a desktop, dashboard, or launcher GUI of the device 100). In this manner, with reference to FIG. 12B and method 1202B, the user device 100 may optionally provide the user prompt 228 to the user 224, as shown in block 1202B. The user device 100 may then receive the second user input 226G from the user 224, e.g., in response to providing the user prompt 228, as shown in block 1204B. In response to receiving the second user input 226G, the user device 100 may set the state of the native app specified by the input 226G as the other state, as shown in block 1206B.

The modules and data stores included in the user device 100 represent features that may be included in the device 100 as it is described in the present disclosure. For example, the processing unit(s) 200, memory component(s) 202, I/O component(s) 204, interconnect component(s) 206, and the various contents thereof may represent features included in the user device 100. The modules and data stores described herein may be embodied by electronic hardware, software, firmware, and/or any combination thereof. Depiction of different features as separate modules and data stores does not necessarily imply whether the modules and data stores are embodied by common or separate electronic hardware, software, and/or firmware components. As such, in some implementations, the features associated with the one or more modules and data stores depicted herein are realized by common or separate electronic hardware, software, and/or firmware components.

The modules and data stores may be embodied by electronic hardware, software, and/or firmware components, including one or more processing units, memory components, I/O components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDDs), solid state drives (SSDs), magnetic tape drives, optical storage technology (e.g., compact disc, digital versatile disc, and/or Blu-ray disc), or any other memory components.

The memory components may include (e.g., store) the data described herein. For example, the memory components may store data included in the API(s) 230 associated with the native app(s) 212 and/or other data. The memory components may also include instructions that may be executed by the processing units. For example, the memory components may include computer-readable instructions that, when executed by the processing units, cause the units to perform the various functions attributed to the modules and data stores described herein.

The I/O components may refer to electronic hardware, software, and/or firmware providing communication with a variety of different devices. For example, the I/O components may provide communication between other devices and the processing units and memory components. In some examples, the I/O components are configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components include hardware, software, and/or firmware configured to communicate with various human interface devices, including (e.g., touchscreen-enabled) display screens, keyboards, pointer devices (e.g., a mouse, or trackpad), (e.g., capacitive, resistive, and/or other) touchscreens, speakers, and microphones. In some examples, the I/O components include hardware, software, and/or firmware configured to communicate with additional devices, such as external memory (e.g., external HDDs).

In some examples, the user device 100 is a system of one or more computing devices configured to implement the techniques described herein. Put another way, the features attributed to the modules and data stores described herein may be implemented by one or more computing devices. Each computing device may include any combination of electronic hardware, software, and/or firmware described above. For example, each computing device may include any combination of the processing units, memory components, I/O components, and interconnect components described above. The computing devices may also include various human interface devices, including display screens, keyboards, pointing devices, touchscreens, speakers, and microphones. The computing devices may also be configured to communicate with additional devices, such as external memory (e.g., external HDDs).

The computing devices of the user device 100 may be configured to communicate with a computer network. The computing devices may also be configured to communicate with one another, e.g., via a computer network. In some examples, the computing devices include one or more computing devices configured to communicate with the API(s) 230 (e.g., transmit native app data requests 232 and receive native app data 234 and app state use data 236). In some examples, the computing devices reside within one or more machines at a single geographic location, or be distributed across a number of geographic locations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A method comprising:
   receiving, via a touchscreen of a computing device, a first input on an application icon displayed on the touchscreen, wherein the application icon is associated with an application installed on the computing device;
   in response to receiving the first input, launching the application and controlling the application to display a home state of the application using the computing device;
   receiving, via the touchscreen, a second input for transitioning the application to another state of the application, wherein the another state is different from the home state of the application;
   in response to receiving the second input, transitioning the application to the another state using the computing device;
   in response to transitioning the application to the another state, identifying a frequency of transitioning the application to the another state;
   based on the frequency, displaying a user interface, independent of the application, for receiving a third input selecting a launch state of the application, the user interface being displayed on the touchscreen concurrently with the another state of the application; and
   in response to receiving the third input selecting the launch state of the application, causing the computing device to, in response to selection of the application icon, launch the application and transition the application to the another state.

2. The method of claim 1, wherein each of the first input and the second input comprises at least one of a finger contact input and a pressure input received via the touchscreen of the computing device.

3. The method of claim 1, wherein each of the first input and the second input comprises a cursor selection input received via at least one of a computer mouse and a trackpad of the computing device.

4. The method of claim 1, wherein causing the computing device to launch the application and transition the application to the another state comprises causing the computing device to launch the application, control the application to display the home state, and transition the application to the another state.

5. The method of claim 1, wherein identifying the frequency of transitioning the application to the another state comprises identifying that the computing device has recently transitioned the application to the another state.

6. The method of claim 1, wherein the identifying the frequency of transitioning the application to the another state comprises identifying that the application has been transitioned to the another state within a specified timeframe and more than a specified number of times.

7. A computing device comprising:
   a touchscreen;
   memory configured to store computer-readable instructions; and
   one or more processors configured to execute the computer-readable instructions, wherein the computer-readable instructions, when executed by the one or more processors, cause the one or more processors to:
      receive, via the touchscreen, a first input on an application (app) icon displayed on the touchscreen, wherein the app icon is associated with an app installed on the computing device;
      in response to receiving the first input, launch the app and control the app to display a home state of the app;
      receive, via the touchscreen, a second input for transitioning the app to another state of the app, wherein the another state is different from the home state of the app;
      in response to receiving the second input, transition the app to the another state;
      in response to transitioning the app to the another state, identify a frequency of transitioning the app to the another state;
      based on the frequency, display a user interface, independent of the app, for receiving a third input selecting a launch state of the app, the user interface being displayed on the touchscreen concurrently with the another state of the app; and
      in response to receiving the third input selecting the launch state of the app, cause the computing device to, in response to selection of the app icon, launch the app and transition the app to the another state.

8. The computing device of claim 7, wherein each of the first input and the second input comprises at least one of a finger contact input and a pressure input received via the touchscreen of the computing device.

9. The computing device of claim 7, wherein each of the first input and the second input comprises a cursor selection input received via at least one of a computer mouse and a trackpad of the computing device.

10. The computing device of claim 7, wherein the computer-readable instructions cause the one or more processors to:
    cause the one or more processors to launch the app, control the app to display the home state, and transition the app to the another state.

11. The computing device of claim 7, wherein the computer-readable instructions cause the one or more processors to:
    identify that the computing device has recently transitioned the app to the another state.

12. The computing device of claim 7, wherein computer-readable instructions cause the one or more processors to:
    identify that the app has been transitioned to the another state within a specified timeframe and more than a specified number of times.

* * * * *